(12) United States Patent
Guo

(10) Patent No.: US 12,093,289 B2
(45) Date of Patent: Sep. 17, 2024

(54) RELATIONSHIP-BASED DISPLAY OF COMPUTER-IMPLEMENTED DOCUMENTS

(71) Applicant: SAP SE, Walldorf (DE)

(72) Inventor: Feng Guo, Beijing (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/076,941

(22) Filed: Dec. 7, 2022

(65) Prior Publication Data

US 2024/0119071 A1    Apr. 11, 2024

(30) Foreign Application Priority Data

Oct. 10, 2022    (CN) .......................... 202211236819.9

(51) Int. Cl.
   *G06F 17/00*    (2019.01)
   *G06F 16/31*    (2019.01)
   *G06F 16/35*    (2019.01)

(52) U.S. Cl.
   CPC .......... *G06F 16/322* (2019.01); *G06F 16/355* (2019.01)

(58) Field of Classification Search
   CPC .................................................... G06F 16/322
   USPC ......................................................... 707/797
   See application file for complete search history.

(56) References Cited

U.S. PATENT DOCUMENTS

| | | | |
|---|---|---|---|
| 9,948,522 B2 * | 4/2018 | Marinelli ............... | H04L 49/40 707/707 |
| 10,749,893 B1 * | 8/2020 | Dahlberg ............ | G06Q 10/067 707/707 |
| 11,556,526 B1 * | 1/2023 | Starnes ............. | G06F 16/24573 707/707 |
| 11,740,927 B2 * | 8/2023 | Bull ........................ | G06Q 40/08 707/690 |
| 2010/0030752 A1 * | 2/2010 | Goldentouch .......... | G06F 16/81 707/E17.108 |
| 2010/0228734 A1 * | 9/2010 | Murthy ................. | G06F 16/258 707/E17.05 |
| 2013/0297658 A1 * | 11/2013 | Guarraci ............... | G06F 16/188 707/797 |
| 2019/0034047 A1 * | 1/2019 | Kwiecien ............... | G06F 16/95 707/707 |
| 2020/0371665 A1 * | 11/2020 | Clausen .................. | G06F 3/017 707/707 |
| 2024/0095987 A1 * | 3/2024 | Piramuthu ............ | G06F 40/166 707/707 |

* cited by examiner

*Primary Examiner* — Alexandria Y Bromell

(74) *Attorney, Agent, or Firm* — Klarquist Sparkman, LLP

(57) ABSTRACT

Techniques and solutions are provided for searching for documents upstream, downstream, or both upstream and downstream of a given document, and providing information about relationships between documents in the results. To help users understand relationships between documents, different "voices" can be used in a result display, such as an "active voice" being used for an upstream search and a "passive voice" being used for a downstream search. If desired, results can be limited or filtered, such as limiting a search to a particular relationship type or types, or providing a limit to an amount of indirection between documents. Disclosed techniques can provide more useful information about a document flow, and can reduce computing resources used in generating such displays.

20 Claims, 38 Drawing Sheets

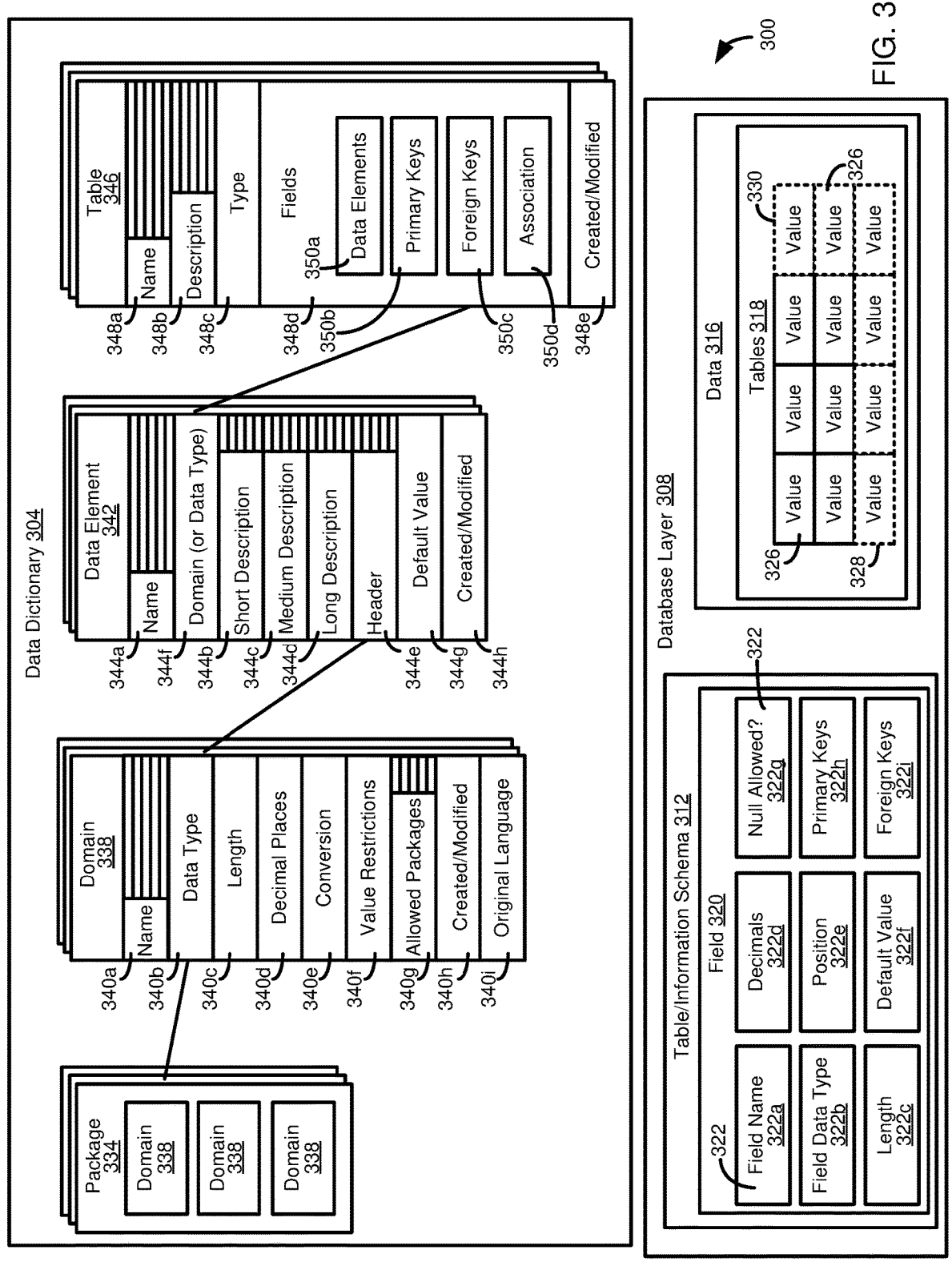

```
@AbapCatalog.sqlViewName: 'ISAMPLESO'
@EndUserText.label: 'Sample Sales Order'
@ObjectModel.compositionRoot: true
@ObjectModel.representativeKey: 'SalesOrder'
@Analytics.dataCategory: #DIMENSION
@AccessControl.authorizationCheck: #CHECK
@Metadata.allowExtensions: true
@Search.searchable: true
define view I_SampleSalesOrder                                                    ─── 404
as select from   vbak                                                             ─── 412
                  └── 416                   └── 416
    left outer to one join vbkd on  vbak.vbeln = vbkd.vbeln
                                and vbkd.posnr = '000000'
    association [0..*] to I_SampleSalesOrderItem as _Item
      on $projection.SalesOrder = _Item.SalesOrder                                ─── 420
    association [0..1] to I_SampleCurrency as _TransactionCurrency
      on $projection.TransactionCurrency = _TransactionCurrency.Currency
    association [0..1] to I_SampleCustomer         as _SoldToParty
      on $projection.SoldToParty = _SoldToParty.Customer
{
    @Search.defaultSearchElement: true
    key cast(vbak.vbeln as vdm_sales_order preserving type) as SalesOrder,
    @ObjectModel.association.type: [#TO_COMPOSITION_CHILD]    //Composition
    _Item,
    vbak.vkorg                                              as SalesOrganization,
    vbak.auart                                              as SalesOrderType,
    vbak.vtweg                                              as DistributionChannel,
    @ObjectModel.foreignKey.association: '_SoldToParty'
    vbak.kunnr                                              as SoldToParty,
    _SoldToParty,                                                      424
    @DefaultAggregation: #SUM
    @Semantics.amount.currencyCode: 'TransactionCurrency'
    vbak.netwr                                              as TotalNetAmount,
    @Semantics.currencyCode: true
    @ObjectModel.foreignKey.association: '_TransactionCurrency'
    vbak.waerk                                              as TransactionCurrency,
    _TransactionCurrency,
    ...
}
where vbak.vbtyp = 'C';
```

FIG. 4

```
@AbapCatalog.sqlViewName: 'ISAMPLESO'
@EndUserText.label: 'Sample Sales Order'
@ObjectModel.compositionRoot: true
@ObjectModel.representativeKey: 'SalesOrder'    504
@Analytics.dataCategory: #DIMENSION
@AccessControl.authorizationCheck: #CHECK
@Metadata.allowExtensions: true
@Search.searchable: true
define view I_SampleSalesOrder
  as select from     vbak
    left outer to one join vbkd on  vbak.vbeln = vbkd.vbeln
                                and vbkd.posnr = '000000'
  association [0..*] to I_SampleSalesOrderItem as _Item
    on $projection.SalesOrder = _Item.SalesOrder
  association [0..1] to I_SampleCurrency as _TransactionCurrency
    on $projection.TransactionCurrency = _TransactionCurrency.Currency
  association [0..1] to I_SampleCustomer         as _SoldToParty
    on $projection.SoldToParty = _SoldToParty.Customer
{
  @Search.defaultSearchElement: true
  key cast(vbak.vbeln as vdm_sales_order preserving type) as SalesOrder,
  @ObjectModel.association.type: [#TO_COMPOSITION_CHILD]    //Composition
  _Item,
  vbak.vkorg                                      as SalesOrganization,
  vbak.auart                                      as SalesOrderType,
  vbak.vtweg                                      as DistributionChannel,
  @ObjectModel.foreignKey.association: '_SoldToParty'
  vbak.kunnr                                      as SoldToParty,
  _SoldToParty,
  @DefaultAggregation: #SUM
  @Semantics.amount.currencyCode: 'TransactionCurrency'
  vbak.netwr                                      as TotalNetAmount,
  @Semantics.currencyCode: true
  @ObjectModel.foreignKey.association: '_TransactionCurrency'
  vbak.waerk                                      as TransactionCurrency,
  _TransactionCurrency,
  ...
}
where vbak.vbtyp = 'C';
```

FIG. 5

```
                                                    508
@EndUserText.label: 'Auto assigned role for I_SampleSalesOrder'
@MappingRole: true
define role I_SampleSalesOrder
  grant select on I_SampleSalesOrder
  where ( SalesOrderType ) =
    aspect pfcg_auth ( v_vbak_aat,
                       auart,
                       actvt = '03' );
```

```
                                                       512
@Metadata.layer: #CORE
annotate view I_SampleSalesOrder
with
{
  @UI.lineItem: [{importance: #HIGH }]
  SalesOrder;
  @UI.lineItem: [{importance: #HIGH }]
  SalesOrderType;
}
```

```
                                                       516
@AbapCatalog.sqlViewAppendName: 'XINSAMPLEISO'
@EndUserText.label: 'Sales Order Extension India'
extend view I_SampleSalesOrder with X_IN_I_SampleSalesorder
{
  _SoldToParty.CustomerClassification
}
```

| Relationship in active voice | Relationship in passive voice |
|---|---|
| Replicates to | Is replicated from |
| Refers to | Is referred to by |
| Clears | Is cleared by |
| Residually Clears | Is residually cleared by |
| Partially Clears | Is partially cleared by |
| Cleared | Was cleared by |
| Residually cleared | Was residually cleared by |
| Reverses | Is reversed by |

FIG. 12

```
//1.  Downstream search process
  METHOD if_fin_cfin_dfa_docrel_builder~build_downstream.
    CLEAR et_relation.
    add_root(
      EXPORTING
        is_doc_key = is_doc_key
      IMPORTING
        es_rel_key = DATA(ls_root_key) ).

add_leaf_downstream(
      EXPORTING
        is_rel_key   = ls_root_key
        iv_rel_level = get_next_level( gc_root_level ) ).

et_relation = get_document_relation( ).
  ENDMETHOD.
//1.1   add leaf node
  METHOD add_leaf_downstream.
    set_search_pointer(
      is_rel_key   = is_rel_key
      iv_rel_level = iv_rel_level ).
    search_reverse_down( ).
    search_clear_down( ).
    search_invoice_reference_down( ) .

refine_pointer_relation( ).
    leaf_document_relation( ).
    add_next_downstream( ).
  ENDMETHOD.

//1.2   add further leaf node via recursion
  METHOD add_next_downstream.
    DATA(lt_next_relation) = mt_pointer_rel.
    DATA(lv_next_level) = get_next_level( mv_pointer_level ).
    LOOP AT lt_next_relation ASSIGNING FIELD-SYMBOL(<ls_relation>).
      DATA(ls_next_key) = CORRESPONDING ts_relation_key( <ls_relation> ).
      add_leaf_downstream(
        EXPORTING
          is_rel_key   = ls_next_key
          iv_rel_level = lv_next_level ).
    ENDLOOP.
  ENDMETHOD.
```

FIG. 20A

```
* 1. start upstream search
 METHOD if_fin_cfin_dfa_docrel_builder~build_upstream.
  CLEAR et_relation.
  add_root(
   EXPORTING
    is_doc_key = is_doc_key
   IMPORTING
    es_rel_key = DATA(ls_root_key) ).

add_leaf_upstream(
   EXPORTING
    is_rel_key  = ls_root_key
    iv_rel_level = get_next_level( gc_root_level ) ).

et_relation = get_document_relation( ).
 ENDMETHOD.
* 1.1 add leaf node
 METHOD add_leaf_upstream.
  set_search_pointer(
   is_rel_key  = is_rel_key
   iv_rel_level = iv_rel_level ).
  search_reverse_up( ).
  search_clear_up( ).
  search_invoice_reference_up( ) .

refine_pointer_relation( ).
  leaf_document_relation( ).
  add_next_upstream( ).
 ENDMETHOD.
* 1.2 add further leaf node via recursion
 METHOD add_next_upstream.
  DATA(lt_next_relation) = mt_pointer_rel.
  DATA(lv_next_level) = get_next_level( mv_pointer_level ).
  LOOP AT lt_next_relation ASSIGNING FIELD-SYMBOL(<ls_relation>).
   DATA(ls_next_key) = CORRESPONDING ts_relation_key( <ls_relation> ).
   add_leaf_upstream(
    EXPORTING
     is_rel_key  = ls_next_key
     iv_rel_level = lv_next_level ).
  ENDLOOP.
 ENDMETHOD.
```

FIG. 20B

```
//      Overall (call upstream first, then find the tip node to do downstream)
METHOD if_fin_cfin_dfa_docrel_builder~build_overall.
  CLEAR et_relation.
  if_fin_cfin_dfa_docrel_builder~build_upstream(
    EXPORTING
      is_doc_key = is_doc_key
    IMPORTING
      et_relation = DATA(lt_rel_up) ).

DATA(lt_tip_doc) = get_tip_document( lt_rel_up ).

LOOP AT lt_tip_doc ASSIGNING FIELD-SYMBOL(<ls_tip_doc>).
    if_fin_cfin_dfa_docrel_builder~build_downstream(
      EXPORTING
        is_doc_key = <ls_tip_doc>
      IMPORTING
        et_relation = DATA(lt_rel_down) ).
    INSERT LINES OF lt_rel_down INTO TABLE et_relation.
  ENDLOOP.
ENDMETHOD.
```

FIG. 20C

⊙ Domain: FIN_CFIN_DFA_RELATION_TYPE

Format
　　Data Type: CHAR
　　Length: 2

▼ Fixed Values
Defines the single fixed values or interval of values

| Fixed Value | Description |
|---|---|
| A1 | Reverses |
| B1 | Clears |
| C1 | Residually Clears |
| D1 | Partially Clears |
| E1 | Invoice Refers To |
| B2 | [Reset] Cleared |
| C2 | [Reset] Residually Cleared |
| 1A | Is Reversed By |
| 1B | Is Cleared By |
| 1C | Is Residually Cleared By |
| 1D | Is Partially Cleared By |
| 1E | Is Invoice Referred By |
| 2B | [Reset] Was Cleared By |
| 2C | [Reset] Was Residually Cleared By |

FIG. 21

```
    mt_relation_priority = VALUE #(
( type = gc_reverses              value = 5 )
( type = gc_clears                value = 4 )
( type = gc_residually_clears     value = 0 )
( type = gc_partially_clears      value = 0 )
( type = gc_invoice_refers_to     value = 3 )
( type = gc_cleared               value = 0 )
( type = gc_residually_cleared    value = 0 )
( type = gc_is_reversed_by        value = 5 )
( type = gc_is_cleared_by         value = 4 )
( type = gc_is_residually_cleared_by   value = 0 )
( type = gc_is_partially_cleared_by    value = 0 )
( type = gc_is_invoice_referred_by     value = 3 )
( type = gc_was_cleared_by             value = 0 )
( type = gc_was_residually_cleared_by  value = 0 ) ).
```

FIG. 22

Item Level Relation Information:

| | Document Status(BKPF-BSTAT) | DB table used for relation building |
|---|---|---|
| 1 | L - Posting Not in Leading Ledger | BSEG_ADD |
| 2 | U - Posting in General Ledger Only | ACDOCA |
| 3 | others | BSEG |

FIG. 26A

Document Search Mode

| Domain | Data Type Length | Description |
|---|---|---|
| FIN_CFIN_DFA_SEARCH_MODE | CHAR/1 | Search Mode |
| Value Rage | | |
| A | | Upstream |
| B | | Downstream |
| C | | Overall |

FIG. 26B

Data Element

| Data Element | Domain | Data Type/Length | Description |
|---|---|---|---|
| FIN_CFIN_DFA_RELATION_TYPE | FIN_CFIN_DFA_RELATION_TYPE | CHAR/2 | Relation Type |
| FIN_CFIN_DFA_RELATION_LEVEL | / | INT 1 (0-255) | Relation Level |
| FIN_CFIN_DFA_SEARCH_MODE | FIN_CFIN_DFA_SEARCH_MODE | CHAR/1 | Search Mode |

FIG. 26C

Document Relation

| Structure | FIN_CFIN_S_DFA_DOCREL | | |
|---|---|---|---|
| Desscription | Doc Flow Analysis Document Relation | | |
| Field Name | Component Type | Data Type/Length | Description |
| DOC_GUID | GUID | RAW/16 | Globally Unique Identifier |
| PREC_DOC_GUID | GUID | RAW/16 | Globally Unique Identifier |
| RELATION_TYPE | FIN_CFIN_DFA_RELATION_TYPE | FIN_CFIN_DFA_RELATION_TYPE | Relation Type |
| RELATION_LEVEL | FIN_CFIN_DFA_RELATION_LEVEL | FIN_CFIN_DFA_RELATION_LEVEL | Relation Level |
| BUKRS | BUKRS | CHAR/4 | Company Code |
| BELNR | BELNR_D | CHAR/10 | Accounting Doc Num |
| GJAHR | GJAHR | NUMC/4 | Fiscal Year |
| PREC_BUKRS | BUKRS | CHAR/4 | Company Code |
| PREC_BELNR | BELNR_D | CHAR/10 | Accounting Doc Num |
| PREC_GJAHR | GJAHR | NUMC/4 | Fiscal Year |

FIG. 26D

| Structure | FIN_CFIN_S_DFA_DOCCHAIN_BASIC | | |
|---|---|---|---|
| Description | Doc Flow Analysis: Basic Document Chain | | |
| Field Name | Component Type | Data Type/Length | Description |
| LOGSYS | LOGSYS | CHAR/10 | Logical System |
| BUKRS | BUKRS | CHAR/4 | Company Code |
| BELNR | BELNR_D | CHAR/10 | Document Number |
| GJAHR | GJAHR | NUMC/4 | Fiscal Year |
| BLART | BLART | CHAR/2 | Document Type |
| BLDAT | BLDAT | DATS/8 | Document Date |
| BUDAT | BUDAT | DATS/8 | Posting Date |
| MONAT | MONAT | NUMC/2 | Posting Period |
| CPUDT | CPUDT | DATS/8 | Entry Date |
| CPUTM | CPUTM | TIMS/6 | Time of Entry |
| TCODE | TCODE | CHAR/20 | Transaction Code |
| BVORG | BVORG | CHAR/16 | Cross-CC Number |
| XBLNR | XBLNR | CHAR/16 | Reference Doc Number |
| WAERS | WAERS | CUKY/5 | Currency Key |
| BSTAT | BSTAT_D | CHAR/1 | Document Status |
| GLVOR | GLVOR | CHAR/4 | Business Transaction |
| AWSYS | AWSYS | CHAR/10 | Logical System |
| AWTYP | AWTYP | CHAR/5 | Reference Procedure |
| AMKEY | AMKEY | CHAR/20 | Reference Key |
| AWREF | AWREF | CHAR/10 | Ref Organizational Units |
| AWORG | AWORG | CHAR/10 | Logical Sys Source Doc |
| XREVERSAL | XREVERSAL | CHAR/1 | Reversal Indicator |
| LDGRP | FAGL_LDGRP | CHAR/4 | Ledger Group |

FIG. 26E

| Structure | FIN_CFIN_S_DFA_DOCCHAIN_BASIC | | |
|---|---|---|---|
| Desscription | Doc Flow Analysis: Source Document Chain | | |
| Field Name | Component Type | Data Type/Length | Description |
| .INCLUDE | FIN_CFIN_S_DFA_DOCCHAIN_BASIC | 0 | Basic Chain |
| TRANSFER_PHASE | FIN_CFIN_DFA_TRANSFER_PHASE | CHAR/1 | Transfer Phase |

FIG. 26F

| Structure | FIN_CFIN_S_DFA_DOCITEM | | |
|---|---|---|---|
| Description | Doc Flow Analysis: Source Document Item | | |
| Field Name | Component Type | Data Type/Length | Description |
| LOGSYS | LOGSYS | CHAR/10 | Logical System |
| BUKRS | BUKRS | CHAR/4 | Company Code |
| BELNR | BELNR_D | CHAR/10 | Document Number |
| GJAHR | GJAHR | NUMC/4 | Fiscal Year |
| BUZEI | BUZEI | NUMC/3 | Item Number |
| AUGDT | AUGDT | DATS/8 | Clearing Date |
| AUGCP | AUGCP | DATS/8 | Clearing Entry Date |
| AUGBL | AUGBL | CHAR/10 | Clearing Document Number |
| AUGGJ | AUGGJ | NUMC/4 | Fiscal Year of Clearing |
| BSCHL | BSCHL | CHAR/2 | Posting Key |
| KOART | KOART | CHAR/1 | Account Type |
| UMSKZ | UMSKZ | CHAR/1 | Special G/L Indicator |
| UMSKS | UMSKS | CHAR/1 | Special G/L Transaction Type |
| ZUMSK | DZUMSK | CHAR/1 | Target Special G/L Indicator |
| SHKZG | SHKZG | CHAR/1 | Debit/Credit Indicator |
| MWSKZ | MWSKZ | CHAR/1 | Tax Code |
| WRBTR | WRBTR | CURR/23 | Amount in document current |
| WAERS | BKPF-WAERS | CUKY/5 | Currency Key |
| SAKNR | SAKNR | CHAR/10 | G/L Account Number |
| HKONT | HKONT | CHAR/10 | General Ledger Account |
| KUNNR | KUNNR | CHAR/10 | Customer Number |
| LIFNR | LIFNR | CHAR/10 | Account Number of Supplier |
| ZLSCH | SCHZW_BSEG | CHAR/1 | Payment Method |
| ZLSPR | DZLSPR | CHAR/1 | Payment Block Key |
| REBZG | REBZG | CHAR/10 | Invoice Reference Number |
| REBZJ | REBZJ | NUMC/4 | Inv Ref Fiscal Year |
| REBZZ | REBZZ | NUMC/3 | Inv Ref Item |
| VBELN | VBELN_VF | CHAR/10 | Billing Document |
| VBEL2 | VBELN_VA | CHAR/10 | Sales Document |
| POSN2 | POSNR_VA | NUMC/6 | Sales Document Item |
| EBELN | EBELN | CHAR/10 | Purchasing Document Number |
| EBELP | EBELP | NUMC/5 | Item No of Pursing Document |
| KOSTL | KOSTL | CHAR/10 | Cost Center |
| AUFNR | AUFNR | CHAR/12 | Order Number |
| PRCTR | PRCTR | CHAR/10 | Profit Center |
| PROJK | PS_PSP_PNR | NUMC/8 | WBS Element |
| PAOBJNR | RKEOBJNR | NUMC/10 | Profitability Seg No (CO_PA) |

FIG. 26G

| Structure | FIN_CFIN_S_DFA_TREE_NODE | | |
|---|---|---|---|
| Desscription | Doc Flow Analysis Tree Node | | |
| Field Name | Component Type | Data Type/Length | Description |
| NODE_KEY | SALV_DE_NODE_KEY | CHAR/12 | Node Key |
| DOC_GUID | GUID | RAW/16 | Globally Unique Identifier |
| PREC_DOC_GUID | GUID | RAW/16 | Globally Unique Identifier |
| RELATION_TYPE | FIN_CFIN_DFA_RELATION_TYPE | | Relation Type |
| RELATION_LEVEL | FIN_CFIN_DFA_RELATION_LEVEL | | Relation Level |

FIG. 26H

| RFC Name | Function Group | Package |
|---|---|---|
| FIN_CFIN_DFA_GET_CHAIN | FIN_CFIN_SUPPORT_TOOLS | FIN_CFIN_INTEGRATION |
| Import | | |
| IT_DOC_KEY | Central Finance: Document Keys | |
| IV_BVORG | Number of Cross-Company Code Posting Transaction | |
| IV_SEARCH_MODE | Document Flow Analysis: Search mode | |
| IV_SEARCH_RESET | Data Element for Domain BOOLE | |
| Export | | |
| ET_RELATION | Document Flow Analysis: Document Relation | |
| ET_CHAIN | Data Flow Analysis: Document Chain | |
| ET_ITEM | Data Flow Analysis: Document Item | |
| ET_BAPIRET2 | Error Messages | |

FIG. 26I

RELATIONSHIP-BASED DISPLAY OF COMPUTER-IMPLEMENTED DOCUMENTS

CROSS-REFERENCE TO RELATED APPLICATION

The present application claims the benefit under 35 U.S.C. § 119 of the earlier filing date of foreign application No. 202211236819.9, filed in China on Oct. 10, 2022. The entire disclosure of foreign application No. 202211236819.9 is considered to be part of the disclosure of the accompanying application and is incorporated herein by reference.

FIELD

The present disclosure generally relates to determining relationships between documents and generating displays of such relationships.

BACKGROUND

Computers are being used for increasingly complex tasks, including for tasks that would be difficult if not impossible without the aid of a computer. Software applications can allow users to create, edit, view, and otherwise interact with documents. A document can be a collection of data associated with one or more data sources, such as one or more tables or views in a relational database system.

Often, documents have a sequenced relationship, such as a chronological sequence. In addition, documents can have relationships to other documents beyond a simple chronological order. For example, one document can affect a status of another document, which can be a creation or editing status, or altering some value that indicates a status of the document in a workflow or other process. However, as the number of documents being analyzed increases, displays of chronologically sequenced views of documents can make it difficult to understand the meaning of the data, such as results provided in a user interface, including to determine whether there may be an error in a document, or a problem with a process with which the documents are associated. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for searching for documents upstream, downstream, or both upstream and downstream of a given document, and providing information about relationships between documents in the results. For an upstream search, the search can continue until a root document is identified. If the search is an overall search, a downstream search can be performed for identified root documents. To help users understand relationships between documents, different "voices" can be used in a result display, such as an "active voice" being used for an upstream search and a "passive voice" being used for a downstream search. If desired, results can be limited or filtered, such as limiting a search to a particular relationship type or types, or providing a limit to an amount of indirection between documents.

In one aspect, the present disclosure provides a method for generating a display of hierarchically related documents. A document identifier is received. A plurality of documents upstream or downstream of a document having the document identifier are identified based at least in part on relationships of one or more relationship types between the plurality of documents and the document. A display is caused to be generated displaying the document and multiple documents of the plurality of documents, the display comprising a hierarchical display of documents organized at least in part using document relationships.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 3 a schematic diagram illustrating components of a data dictionary and components of a database layer.

FIG. 4 is code for an example metadata model for a database view of a virtual data model.

FIG. 5 is code for an example metadata model for a view of a virtual data model, and for metadata models which modify or refer to such example metadata model.

FIG. 12 is a table listing various type of relationships, considered from the perspective of each of two documents in the relationship.

FIG. 20A is example pseudocode for a downstream search process.

FIG. 20B is example pseudocode for an upstream search process.

FIG. 20C is example pseudocode for a combined upstream and downstream search process.

FIG. 21 is an example of values indicating various document relationship types.

FIG. 22 is an example of how different relationship types can be assigned differing priorities, which can be used in generating a display of document relationships.

FIG. 26A provides example tables that can be used to build document relationships.

FIG. 26B illustrates how particular values of an attribute can be used to specify a search mode.

FIG. 26C illustrates definitions of example data elements that can be used to represent a document relation type, a document relation level, and a document search mode.

FIG. 26D illustrates example attributes that can be used to store document relationship information.

FIG. 26E illustrates example attributes that can be used to store information about a chain of related documents.

FIG. 26F illustrates attributes that can be used in sending information about a document chain to another computing system.

FIG. 26G illustrates attributes that can be used to store information about a document in a document chain.

FIG. 26H illustrates attributes that can be used to store information about nodes in a document tree.

FIG. 26I illustrates input and output parameters for a remote function call useable to obtain a document flow analysis.

DETAILED DESCRIPTION

Example 1—Overview

Figure 1:
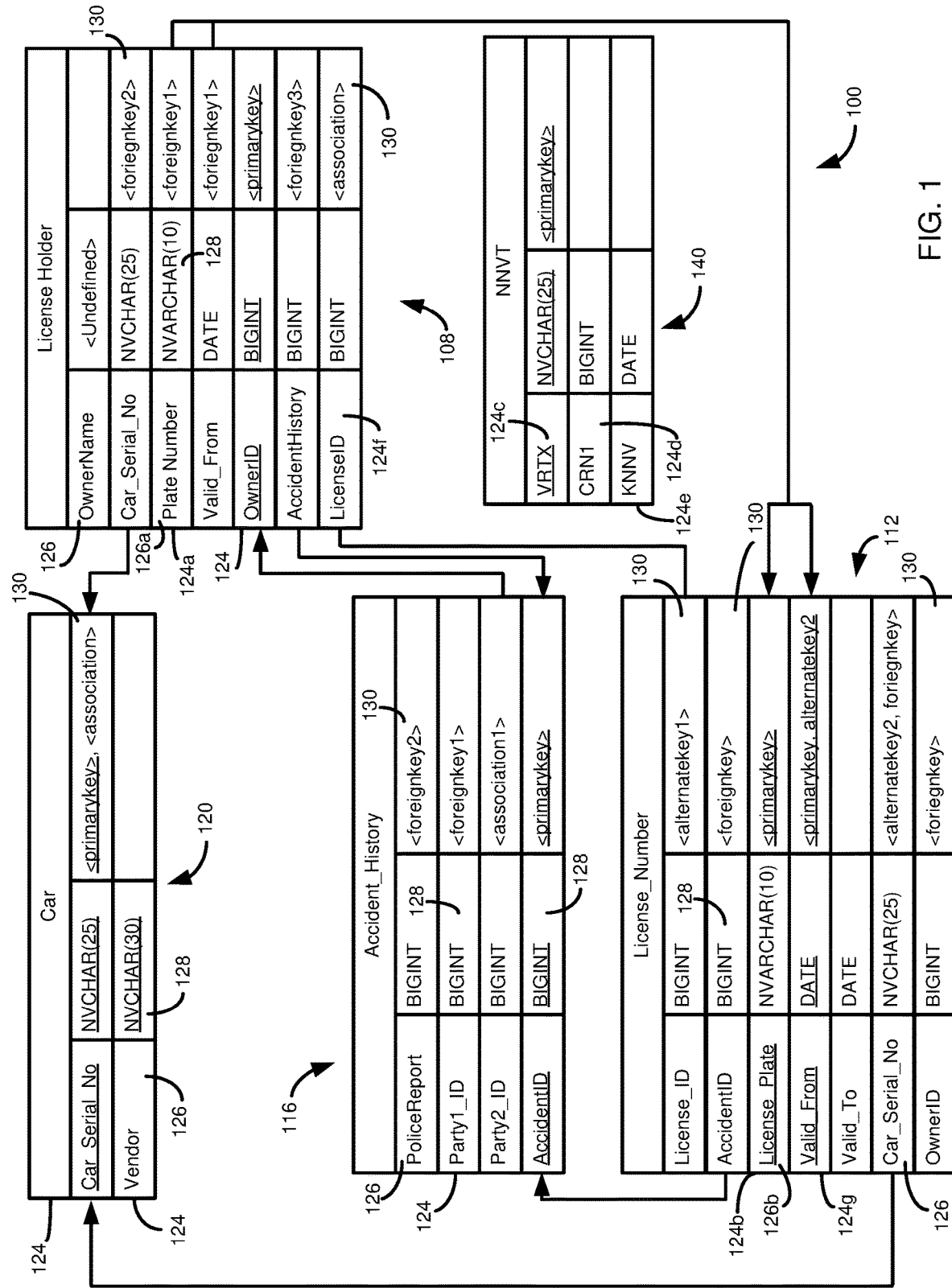
FIG. 1 is a diagram of a database schema showing technical relationships between at least a portion of database tables in the schema.

Computers are being used for increasingly complex tasks, including for tasks that would be difficult if not impossible without the aid of a computer. Software applications can allow users to create, edit, view, and otherwise interact with documents. A document can be a collection of data associated with one or more data sources, such as one or more tables or views in a relational database system.

Often, documents have a sequenced relationship, such as a chronological sequence. In addition, documents can have relationships to other documents beyond a simple chronological order. For example, one document can affect a status of another document, which can be a creation or editing status, or altering some value that indicates a status of the document in a workflow or other process. However, as the number of documents being analyzed increases, displays of chronologically sequenced views of documents can make it difficult to understand the meaning of the data, such as results provided in a user interface, including to determine whether there may be an error in a document, or a problem with a process with which the documents are associated. Accordingly, room for improvement exists.

The present disclosure provides techniques that identify relationships between documents, and where the relationship information can be used to provide reports or other data visualizations to a user that allow a user to better understand how documents are related, including how they relate to a particular process or subprocess. In some cases, relationships between documents can be used to filter relevant results, so that a user is presented with a smaller, more relevant dataset. In addition to identifying documents, and optionally showing relationships between documents, information about documents can be displayed to help a user understand how a process has occurred and possible sources of any errors. For example, a display can include data for various document attributes (or fields, which can correspond to attributes or fields in relational database tables). Document information can also include a document type, or information about a status of a document, including based on relationships of that document with other documents.

In some cases, documents can have reciprocal relationships. For example, a particular document may be replicated. The original document can have a "replicates to" relationship with the replica, while the replica document can have a "is replicated from" relationship with the original document. These relationships can be used for a variety of purposes, including finding documents that are "upstream" or "downstream" from a given document. In the case of the original and replica documents, the replica can be considered downstream from the original, and the original can be considered upstream from the replica.

In various scenarios, it may be useful to know what documents are upstream, downstream, or both upstream and downstream of a given document. A user or process can specify a particular search type, a particular starting document, and optionally other parameters of a document identification process. For example, a user can select whether, or to what extent, "branches" of a document tree should be followed. In one example, a user can specify a search that searches both upstream and downstream of a given document, such as identifying a "root" document upstream of the given document, and then looking at documents downstream from the root, even if those documents are not on the same branch as the given document.

In some cases, it may be desirable to present additional information about documents upstream, downstream, or both upstream and downstream of a given document. For example, there may be documents that are not affected by a document of the search results, or do not affect a document in the search results, but can provide useful information to a user. Documents having these "neutral" relationships can be identified for one or more documents in a set of search results and appended to the search results/provided in a user display.

The present disclosure provides a number of benefits. For example, by searching based on document relationships, more relevant data can be presented to a user. In addition, these techniques can conserve computing resources, such as processor, memory, or network resources, by reducing a size of a data set. The techniques can also result in displays that provide more relevant information about documents to a user, which can help a user understand the documents, relationships between documents, and an overall process with which the documents are associated. This benefit can be enhanced by providing a description of how documents are related in a display of document information, or providing documents in an arrangement, such as a hierarchy, that illustrates document relationships.

Examples 2-9 illustrate various software/data layers that can exist in a system, such as from a level where data is stored, such as relational database tables, to higher layers where users are more likely to interact with the underlying data. For example, often users will not have direct access to database tables, but rather can access the data through higher-level computing objects such as objects in a virtual data model that references a data source (such as a relational database), or a logical data object (such as a BusinessObject as implemented in technologies available from SAP SE of Walldorf, Germany). Example 10 describes an example database environment that can be used with disclosed techniques. For example, document information can be stored in the database, and the information used to identify and follow document relationships, as well as to obtain information about document attributes, document types, or document status information. Examples 11-18 illustrate innovative techniques for identifying related documents and providing such information to a user in an easily understandable way.

Example 2—Example Database Schema with Technical Relationships

FIG. 1 is an example entity-relation (ER) type diagram illustrating a data schema 100 related to a driver's accident history. The schema 100 (which can be part of a larger schema, the other components not being shown in FIG. 1) can include a table 108 associated with a license holder (e.g., an individual having a driver's license), a table 112 associated with a license, a table 116 representing an accident history, and a table 120 representing cars (or other vehicles).

Each of the tables 108, 112, 116, 120 can include a plurality of fields 124. Each field 124 can be associated with technical information, such as a name or identifier 126, a datatype 128, and a flag or status indicator 130 indicating whether the field represents a primary key, indicates a foreign key relationship with another table, or indicates another type of technical relationship with another table. The flag 130 represents technical information that can be used to link two or more tables, including linking particular fields 124 of particular tables. The status indicator 130 can be an indicator of an inherent relationship between two tables (or, more generally, between two database objects).

Schema information with technical information is typically maintained in a database layer, such as a software layer associated with where table values are maintained (e.g., in a RDBMS), and typically includes identifiers for the tables 108, 112, 116, 120, and the name 126 and datatype 128 of their associated fields 124. Schema information may also include at least some of the information conveyable using the flag 130, such as whether a field is associated with a primary key, or indicating a foreign key relationship. However, other relationships, including more informal associations, may not be included in a schema associated with a database layer (e.g., the INFORMATION_SCHEMA of PostgreSQL).

Database layer schema information typically does not include semantic information. Although, in the particular example shown, the fields 124 have names 126 that at least suggest the meaning of their content, in many database schemas, the fields do not have names which convey the meaning of a field. In any event, fields 124 having the same semantic information, or having at least some semantic information in common, may have different technical information. For example, field 124a has the name 126a of "Plate Number," which may or may not have the same semantic meaning as field 124b with the name 126b of "License Plate." A search of the database for information regarding "License Plate" may retrieve records associated with name 126b, but may miss records with the name 126a. The converse can also be true, where a search for "License Plate" may retrieve records from two tables, even though the term has different semantic meanings in the two fields. That is, two fields may have the same name by coincidence (or through a design that simply is not concerned about such redundancies).

Apart from missing some records that have overlapping or identical semantics, or retrieving records with different semantics, there is the question of how potentially relevant tables should be located. As discussed above, especially for large, complex database systems, it can be difficult for any particular user to be fully aware of the entire database schema. Technical users may have a better understanding of the technical nature of the database, but may lack insights into the meaning, or semantic information, of the data, in order to retrieve appropriate data from the database. Similarly, non-technical users may understand what information they want, but not how to get it, including not understanding the database schema or query languages. Although it may be possible to find some semantically related tables through technical relationships, such as foreign key relationships, such a search may fail to find some related tables.

FIG. 1 includes a table 140. The table 140 does not have a technical relationship with any other table in the portion of the schema 100 shown in FIG. 1. In addition, the fields 124c-124e have names that do not readily convey their meaning or purpose, or indicate whether they might have the same meaning or purpose as other fields 124 in the schema 100. For instance, field 124c may have the same semantic meaning as field 124a, field 124d may have the same meaning as field 124f, and field 124e may have the same meaning as field 124g. Thus, a search for field 124d may miss results in table 140, as it may not be known that table 140 should be searched, and, based on the different field names 126, the results in table 140 would be missed even if table 140 were included in the search.

Example 3—Example Table Elements Including Semantic Identifiers

Figure 2:
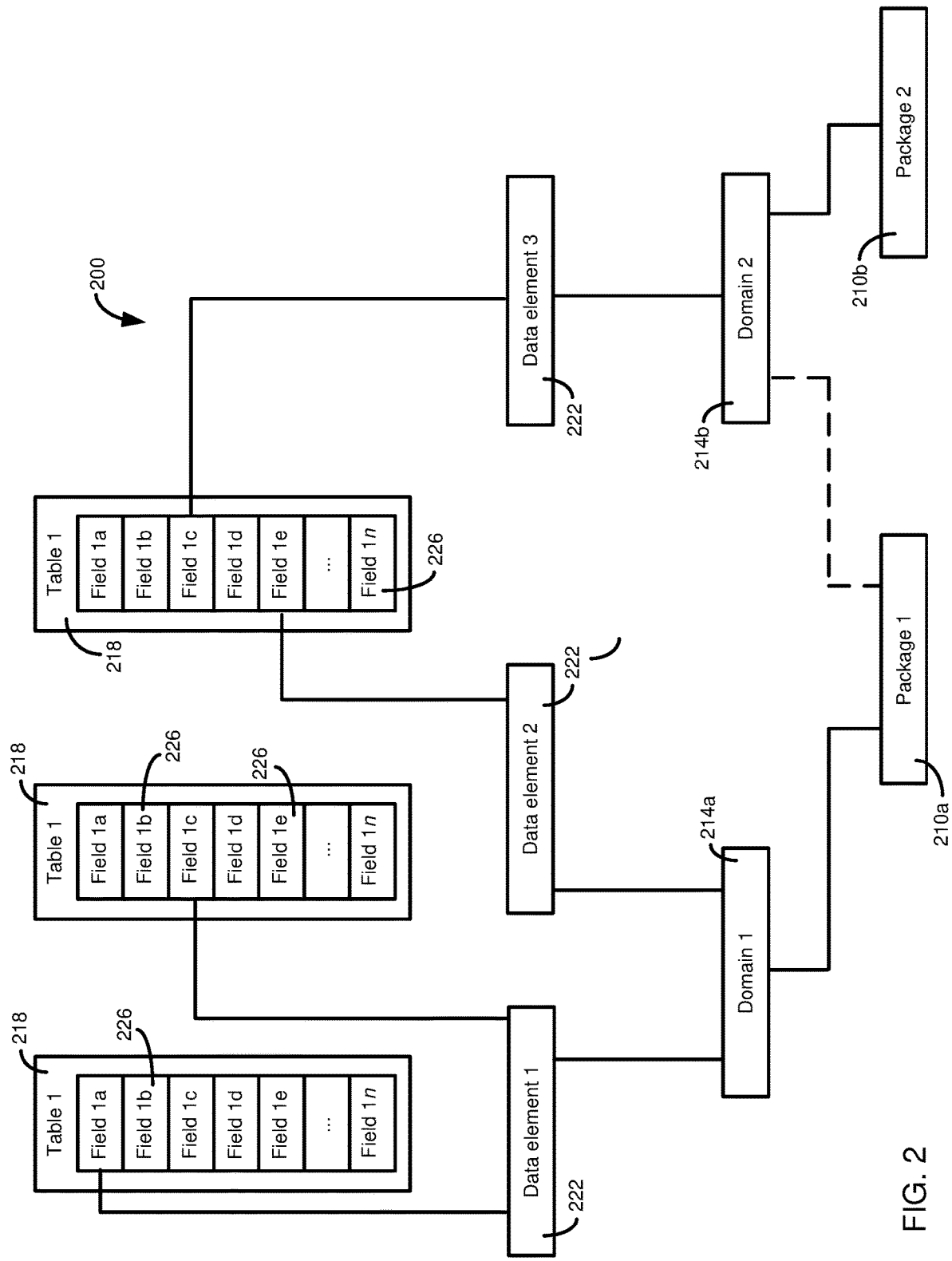
FIG. 2 is a schematic diagram illustrating relationships between table elements that can be included in a data dictionary, or otherwise used to define database tables.

FIG. 2 is a diagram illustrating elements of a database schema 200 and how they can be interrelated. In at least some cases, the database schema 200 can be maintained other than at the database layer of a database system. That is, for example, the database schema 200 can be independent of the underlying database, including a schema used for the underlying database. Typically, the database schema 200 is mapped to a schema of the database layer (e.g., schema 100 of FIG. 1), such that records, or portions thereof (e.g., particular values of particular fields) can be retrieved through the database schema 200.

The database schema 200 can include one or more packages 210. A package 210 can represent an organizational component used to categorize or classify other elements of the schema 200. For example, the package 210 can be replicated or deployed to various database systems. The package 210 can also be used to enforce security restrictions, such as by restricting access of particular users or particular applications to particular schema elements.

A package 210 can be associated with one or more domains 214 (i.e., a particular type of semantic identifier or semantic information). In turn, a domain 214 can be associated with one or more packages 210. For instance, domain 1, 214a, is associated only with package 210a, while domain 2, 214b, is associated with package 210a and package 210b. In at least some cases, a domain 214 can specify which packages 210 may use the domain. For instance, it may be that a domain 214 associated with materials used in a manufacturing process can be used by a process-control application, but not by a human resources application. Domains can be, or can identify, a type of inherent relationship. Note that, for the present disclosure, "inherent" relationships can be either technical or semantic, provided they are definitional aspects of an object.

In at least some implementations, although multiple packages 210 can access a domain 214 (and database objects that incorporate the domain), a domain (and optionally other database objects, such as tables 218, data elements 222, and fields 226, described in more detail below) is primarily assigned to one package. Assigning a domain 214, and other database objects, to a unique package can help create logical (or semantic) relationships between database objects. In FIG. 2, an assignment of a domain 214 to a package 210 is shown as a solid line, while an access permission is shown as a dashed line. So, domain 214a is assigned to package 210a, and domain 214b is assigned to package 210b. Package 210a can access domain 214b, but package 210b cannot access domain 214a.

Note that at least certain database objects, such as tables 218, can include database objects that are associated with multiple packages. For example, a table 218, Table 1, may be assigned to package A, and have fields that are assigned to package A, package B, and package C. The use of fields assigned to packages A, B, and C in Table 1 creates a semantic relationship between package A and packages B and C, which semantic relationship can be further explained if the fields are associated with particular domains 214 (that is, the domains can provide further semantic context for database objects that are associated with an object of another package, rather than being assigned to a common package).

As will be explained in more detail, a domain 214 can represent the most granular unit from which database tables 218 or other schema elements or objects can be constructed. For instance, a domain 214 may at least be associated with a datatype. Each domain 214 is associated with a unique name or identifier, and is typically associated with a description, such as a human readable textual description (or an identifier than can be correlated with a human readable textual description) providing the semantic meaning of the domain. For instance, one domain 214 can be an integer value representing a phone number, while another domain can be an integer value representing a part number, while yet another integer domain may represent a social security number. The domain 214 thus can help provide common and consistent use (e.g., semantic meaning) across the schema 200. That is, for example, whenever a domain representing a social security number is used, the corresponding fields can be recognized as having this meaning even if the fields or data elements have different identifiers or other characteristics for different tables.

The schema 200 can include one or more data elements 222. Each data element 222 is typically associated with a single domain 214. However, multiple data elements 222 can be associated with a particular domain 214. Although not shown, multiple elements of a table 218 can be associated with the same data element 222, or can be associated with different data elements having the same domain 214. Data elements 222 can serve, among other things, to allow a domain 214 to be customized for a particular table 218. Thus, the data elements 222 can provide additional semantic information for an element of a table 218.

Tables 218 include one or more fields 226, at least a portion of which are mapped to data elements 222. The fields 226 can be mapped to a schema of a database layer, or the tables 218 can be mapped to a database layer in another manner. In any case, in some embodiments, the fields 226 are mapped to a database layer in some manner. Or, a database schema can include semantic information equivalent to elements of the schema 200, including the domains 214.

In some embodiments, one or more of the fields 226 are not mapped to a domain 214. For example, the fields 226 can be associated with primitive data components (e.g., primitive datatypes, such as integers, strings, Boolean values, character arrays, etc.), where the primitive data components do not include semantic information. Or, a database system can include one or more tables 218 that do not include any fields 226 that are associated with a domain 214. However, the disclosed technologies can include a schema 200 (which can be separate from, or incorporated into, a database schema) that includes a plurality of tables 218 having at least one field 226 that is associated with a domain 214, directly or through a data element 222.

Example 4—Example Data Dictionary Components

Schema information, such as information associated with the schema 200 of FIG. 2, can be stored in a repository, such as a data dictionary. As discussed, in at least some cases the data dictionary is independent of, but mapped to, an underlying relational database. Such independence can allow the same database schema 200 to be mapped to different underlying databases (e.g., databases using software from different vendors, or different software versions or products from the same vendor). The data dictionary can be persisted, such as being maintained in a stored table, and can be maintained in memory, either in whole or part. An in-memory version of a data dictionary can be referred to as a dictionary buffer.

FIG. 3 illustrates a database environment 300 having a data dictionary 304 that can access, such as through a mapping, a database layer 308. The database layer 308 can include a schema 312 (e.g., an INFORMATION_SCHEMA as in PostgreSQL) and data 316, such as data associated with tables 318. The schema 312 includes various technical data items/components 322, which can be associated with a field 320, such as a field name 322a (which may or may not correspond to a readily human-understandable description of the purpose of the field, or otherwise explicitly describe the semantic meaning of values for that field), a field data type 322b (e.g., integer, varchar, string, Boolean), a length 322c (e.g., the size of a number, the length of a string, etc., allowed for values in the field), a number of decimal places 322d (optionally, for suitable datatypes, such as, for a float with length 6, specifying whether the values represent XX.XXXX or XXX.XXX), a position 322*e* (e.g., a position in the table where the field should be displayed, such as being the first displayed field, the second displayed field, etc.), optionally, a default value 322*f* (e.g., "NULL," "0," or some other value), a NULL flag 322*g* indicating whether NULL values are allowed for the field, a primary key flag 322*h* indicating whether the field is, or is used in, a primary key for the table, and a foreign key element 322*i*, which can indicate whether the field 320 is associated with a primary key of another table, and, optionally, an identifier of the table/field referenced by the foreign key element. A particular schema 312 can include more, fewer, or different technical data items 322 than shown in FIG. 3.

The tables 318 are associated with one or more values 326. The values 326 are typically associated with a field 320 defined using one or more of the technical data elements 322. That is, each row 328 typically represents a unique tuple or record, and each column 330 is typically associated with a definition of a particular field 320. A table 318 typically is defined as a collection of the fields 320, and is given a unique identifier.

The data dictionary 304 includes one or more packages 334, one or more domains 338, one or more data elements 342, and one or more tables 346, which can at least generally correspond to the similarly titled components 210, 214, 222, 218, respectively, of FIG. 2. As explained in the discussion of FIG. 2, a package 334 includes one or more (typically a plurality) of domains 338. Each domain 338 is defined by a plurality of domain elements 340. The domain elements 340 can include one or more names 340*a*. The names 340*a* serve to identify, in some cases uniquely, a particular domain 338. A domain 338 includes at least one unique name 340*a*, and may include one or more names that may or may not be unique. Names which may or may not be unique can include versions of a name, or a description, of the domain 338 at various lengths or levels of detail. For instance, names 340*a* can include text that can be used as a label for the domain 338, and can include short, medium, and long versions, as well as text that can be specified as a heading. Or, the names 340*a* can include a primary name or identifier and a short description or field label that provides human understandable semantics for the domain 338.

In at least some cases, the data dictionary 304 can store at least a portion of the names 340*a* in multiple languages, such as having domain labels available for multiple languages. In embodiments of the disclosed technologies, when domain information is used for identifying relationships between tables or other database elements or objects, including searching for particular values, information, such as names 340*a*, in multiple languages can be searched. For instance, if "customer" is specified, the German and French portion of the names 340*a* can be searched as well as an English version.

The domain elements 340 can also include information that is at least similar to information that can be included in the schema 312. For example, the domain elements 340 can include a data type 340*b*, a length 340*c*, and a number of decimal places 340*d* associated with relevant data types, which can correspond to the technical data elements 322*b*, 322*c*, 322*d*, respectively. The domain elements 340 can include conversion information 340*e*. The conversion information 340*e* can be used to convert (or interconvert) values entered for the domain 338 (including, optionally, as modified by a data element 342). For instance, conversion information 340 can specify that a number having the form XXXXXXXXX should be converted to XXX-XX-XXXX, or that a number should have decimals or comma separating various groups of numbers (e.g., formatting 1234567 as 1,234,567.00). In some cases, field conversion information for multiple domains 338 can be stored in a repository, such as a field catalog.

The domain elements 340 can include one or more value restrictions 340*f*. A value restriction 340*f* can specify, for example, that negative values are or are not allowed, or particular ranges or threshold of values that are acceptable for a domain 338. In some cases, an error message or similar indication can be provided if a value is attempted to be used with a domain 338 that does not comply with a value restriction 340*f*. A domain element 340*g* can specify one or more packages 334 that are allowed to use the domain 338.

A domain element 340*h* can specify metadata that records creation or modification events associated with a domain element 338. For instance, the domain element 340*h* can record the identity of a user or application that last modified the domain element 340*h*, and a time that the modification occurred. In some cases, the domain element 340*h* stores a larger history, including a complete history, of creation and modification of a domain 338.

A domain element 340*i* can specify an original language associated with a domain 338, including the names 340*a*. The domain element 340*i* can be useful, for example, when it is to be determined whether the names 340*a* should be converted to another language, or how such conversion should be accomplished.

Data elements 342 can include data element fields 344, at least some of which can be at least generally similar to domain elements 340. For example, a data element field 344*a* can correspond to at least a portion of the name domain element 340*a*, such as being (or including) a unique identifier of a particular data element 342. The field label information described with respect to the name domain element 340*a* is shown as separated into a short description label 344*b*, a medium description label 344*c*, a long description label 344*d*, and a header description 344*e*. As described for the name domain element 340*a*, the labels and header 344*b*-344*e* can be maintained in one language or in multiple languages.

A data element field 344*f* can specify a domain 338 that is used with the data element 342, thus incorporating the features of the domain elements 340 into the data element. Data element field 344*g* can represent a default value for the data element 342, and can be at least analogous to the default value 322*f* of the schema 312. A created/modified data element field 344*h* can be at least generally similar to the domain element 340*h*.

Tables 346 can include one or more table elements 348. At least a portion of the table elements 348 can be at least similar to domain elements 340, such as table element 348*a* being at least generally similar to domain element 340*a*, or data element field 344*a*. A description table element 348*b* can be analogous to the description and header labels described in conjunction with the domain element 340*a*, or the labels and header data element fields 344*b*-344*e*. A table 346 can be associated with a type using table element 348*c*. Example table types include transparent tables, cluster tables, and pooled tables, such as used as in database products available from SAP SE of Walldorf, Germany.

Tables 346 can include one or more field table elements 348*d*. A field table element 348*d* can define a particular field of a particular database table. Each field table element 348*d* can include an identifier 350*a* of a particular data element 342 used for the field. Identifiers 350*b*-350*d*, can specify whether the field is, or is part of, a primary key for the table (identifier 350b), or has a relationship with one or more fields of another database table, such as being a foreign key (identifier 350c) or an association (identifier 350d).

A created/modified table element 348e can be at least generally similar to the domain element 340h.

Example 5—Example Metadata Model

FIG. 4 illustrates a definition of a metadata model 400. The metadata model 400, in particular, represents a view, such as a Core Data Services view of SAP SE, of Walldorf, Germany. The metadata model 400 can include a variety of different components, at least some of which can be considered to be metadata models. That is, the metadata model 400 can be a model that is based at least in part on multiple sub-models. The sub-models can specify particular aspects of the overall metadata model 400.

The metadata model 400 can optionally include one or more annotations 404. An annotation can be a metadata component that can be added to a metadata model. For example, a provider may supply a base model, and individual users or customers may wish to add metadata that is specific to their operating environment and use cases. The ability to add annotations can thus enhance usability by allowing for custom metadata elements, without impacting other users of a base metadata model. Annotations can be specified for different software layers or frameworks.

In the example shown, annotations 404 can be indicated as annotations using particular syntax elements, such as by preceding an annotation with the "@" symbol. In at least some cases, annotations 404 can also be indicated by placing them in the appropriate portion of a metadata model, such as in a header section or another section designated for annotations. In some cases, annotations 404 can reference other metadata models, such as a metadata model of a data source, or can reference a data source that is associated with a metadata model. In either event, such an association 404 can create a dependency between the metadata model 400 and the other metadata model/data source.

The metadata model 400 can include instructions 408, in this case a SQL statement 410, defining a core metadata model/object having an identifier 412 (which can be used, for example to later access or activate, such as to instantiate, the metadata model). In particular, the instructions 408 shown define a view. The annotations 404 further specify properties of the view, as do other portions of the metadata model 400 that will be further described.

The instructions 408 can specify one or more data sources 416. Data sources 416 can define data to which at least a portion of the metadata of the metadata model 400 will apply, and can also supply additional metadata for the metadata model 400. Note that the metadata model 400 can be, in at least a sense, dependent on referenced data sources 416. For example, if the metadata model 400 relies on particular expected data or metadata of a data source 416, the metadata model may be unusable, have performance issues, or provide incorrect results if the referenced data sources do not include expected data or metadata, or are otherwise inconsistent with how the data source is used in the metadata model. As shown, the data sources 416 includes two tables, "vbak" and "vbkd." These tables will typically include metadata features such as one or more fields, where each field is associated with a data type, designations of a primary key, and optionally associations with other database components, such as association or foreign key relationships with other database tables.

The metadata model 400 can optionally include specifications of one or more associations 420. An association 420 can define a relationship to another entity. An association 420 can be processed during the use of the metadata model 400, such as being converted to a SQL expression such as a JOIN. Unlike other conditions or elements that are included in the metadata model 400, associations can define a relationship that can at least in some cases be optional, such as being selectively activated depending upon how the metadata model is accessed. For example, an association 420 can be converted to a JOIN condition that uses a table provided in a SELECT statement that references the metadata model 400.

The metadata model 400 can include one or more components 422 that specify how data retrieved using the metadata model should be processed, including to generate values that are associated with other metadata elements of the metadata model. Processing can include calculating values, such as using a formula specified in, or referenced by, the metadata model 400. In particular, a processing component 422 can specify that a particular field value should be treated as an element 424. Thus, the metadata model 400 can include dependencies on how elements are defined, and the metadata model 400 may not be accurate, or useable, if the element definition does not match how it is used, and intended to be used, in the metadata model 400.

The metadata model 400 can optionally include additional components, such as one or more conditions 428, or other operations, such as aggregations, unions, etc., including such operations that are typically supported by a database query language. In addition to instantiated artifacts, information about the artifacts can be stored in a persistency model, such as one or more database tables. An example persistency model that can be used with artifacts is disclosed in U.S. patent application Ser. No. 16/387,983, filed Apr. 18, 2019, and incorporated by reference herein.

Example 6—Example Metadata Model, Including Relationships with Other Metadata Models FIG. 5 illustrates how metadata models may have dependencies on other metadata models. In particular, FIG. 5 shows a view metadata model 504, which can be the metadata model 400 of FIG. 4. FIG. 5 also illustrates a metadata model 508 for an access control object (such as a DCLS, or data control language source), a metadata model 512 for a metadata extension object (such as a DDLX, or metadata extension), and a metadata model 516 for an extension element object (such as a DDLS, or data definition language source).

The access control object metadata model 508 can be used for restricting access to data that can be retrieved using the view metadata model 504. For example, the view metadata model 504 and the access control object metadata model 508 can be processed together when the view metadata model 504 is activated, such as to generate SQL commands that retrieve data for the view metadata model, but which are filtered or restricted based on the access control object metadata model. As the access control object metadata model 508 references the view metadata model 504, the access control object metadata model depends on the view existing, and on the view containing elements specified in the access control object metadata model. For example, the access control object metadata model references the "SalesOrderType" element of the view "I_SampleSalesOrder" and the authorization object "V_VBAK_AAT" with its authorization field "AUART." Thus, the first element would be undefined or unusable if the corresponding element did not exist in the view metadata model 504.

Figure 6:
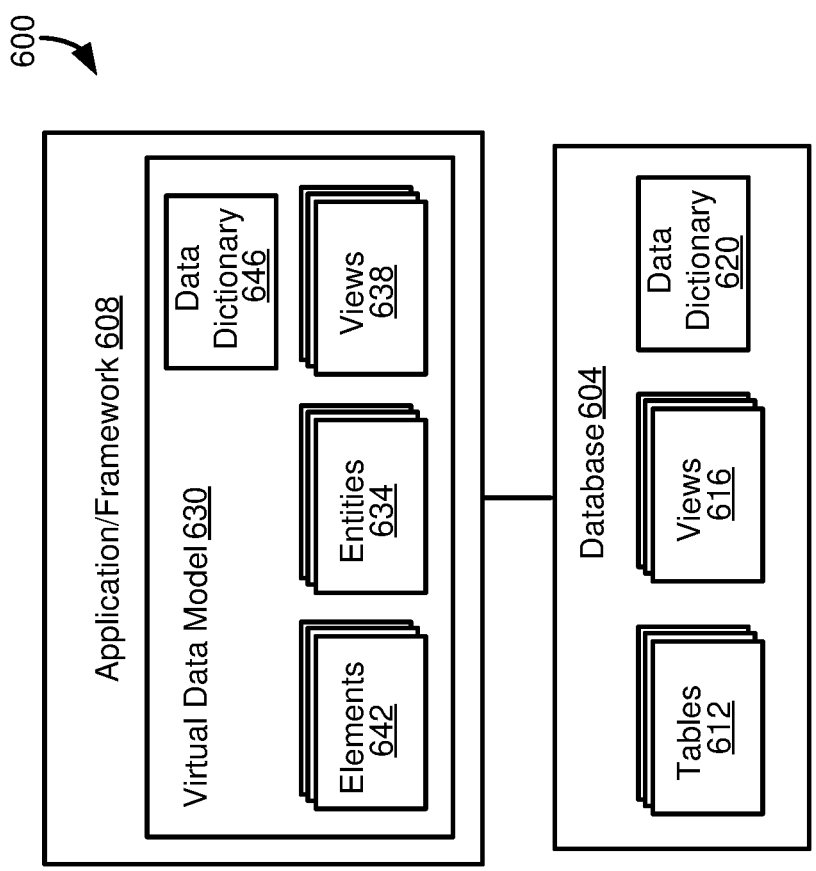
FIG. 6 is a diagram of a computing environment illustrating how a virtual data model can interact with a database system.

Example 7—Example Computing Environment Having Virtual Data Model Interacting with Database System FIG. 6 illustrates an example computing environment 600 in which disclosed technologies can be implemented. At a high level, the computing environment 600 includes a database system 604 that can communicate with an application or framework layer 608. The database system 604 includes data that can be used by the application/framework layer 608, or applications that communicates with the application/framework layer. The data can be stored in one or more tables 612 of the database 604. The data can be referenced by one or more views 616, which can be view definitions or materialized views (which can then also correspond to tables 612). A data dictionary 620 can store information regarding the tables 612 and the views 616.

The application/framework layer 608 includes a virtual data model 630. The virtual data model 630 can include entities 634 and views 638, which can at least generally correspond to the tables 612 and the views 616 of the database 604. However, as has been described, as compared with the tables 612 and views 616, artifacts in the virtual data model 630 are typically associated with additional information, such as semantic information or information that can be used to manipulate data in one or more artifacts of the database 604 that corresponds to a given artifact in the virtual data model. The virtual data model 630 can include information regarding elements 642, which can correspond to attributes or fields used in the entities 634 and views 638. At least some of the elements 642 can correspond to fields used in the database 604, but are enriched with additional information. Information regarding the entities 634, views 638, and elements 642 can be stored in a data dictionary 646 of the virtual data model 630.

Generally, as used in the present disclosure, a data artifact refers to an artifact in the virtual data model 630 that is intended for direct use by a user or application. A data artifact can include data elements, including those that refer to data stored in the database 604. However, a data artifact can also include metadata elements, which can describe data elements, or how the data artifact can be used or how it may be processed. Data elements and metadata elements can be collectively referred to as components of an artifact.

Example 8—Example Logical Data Object Schema

In any of the Examples described herein, a logical data object be a specific example of an object in an object-oriented programming approach. However, unless the context specifically indicates otherwise, aspects of the present disclosure described with respect to logical data objects can be applied to other types of objects, or other types of data collections. For example, a database table, or a group of related tables, can have fields that are analogous to data members of an object. Functions that correspond to member functions of an object can be defined to perform operations on the tables.

A logical data object can contain a definition of a hierarchical data structure and definitions of one or more operations that can be performed using portions of the hierarchical data structure. In some cases, a logical data object may be referred to as a "business object" and can take any number of forms including business intelligence or performance management components such as those implemented in software technologies of SAP BusinessObjects, ORACLE Hyperion, IBM Cognos, and others. However, the use of logical data objects in computer applications is not limited to "business" scenarios. Logical data objects can be used to define a particular application and/or problem domain space. Aspects and artifacts of a given problem domain can be defined using the hierarchical data structure and various portions of these aspects and/or artifacts can be associated directly with definitions of relevant logical operations. A logical data object can be an artifact of a virtual data model, or can be constructed with reference to artifacts of a virtual data model. In turn, components of the virtual data model can be mapped to another data model, such as a physical data model of a relational database system.

Figure 7:
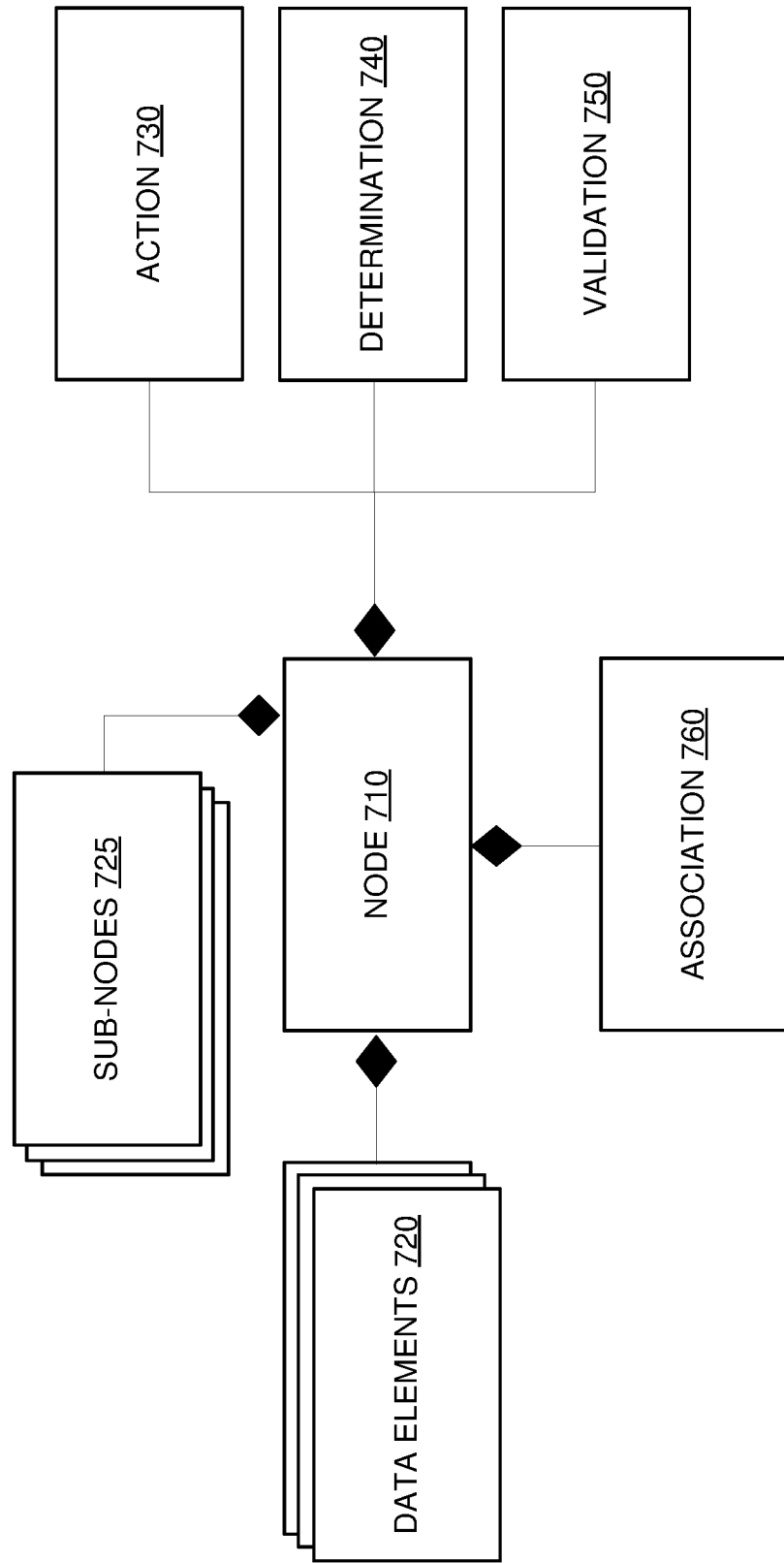
FIG. 7 is a block diagram depicting a schema for a logical data object.

FIG. 7 is a diagram of an example logical data object schema 700. A node 710 can contain one or more data elements 720 (i.e., variables, such as data members). A data element 720 can contain an identifier, such as a name, and an associated value. The identifier can, for example, be associated with a field of a particular database table. In at least some embodiments, the data element 720 can be associated with a data type that restricts and/or validates the type of data that can be stored as a value of the data element 720.

The node 710 can contain one or more child nodes 725 (also referred to as sub-nodes), which can themselves contain additional data elements 720 (and other node components, including sub-nodes 725). Combinations of sub-nodes 725 can be used to define a hierarchical data structure of multiple nodes 710. In at least some embodiments, the hierarchical data structure can contain a root node that does not have a parent-node and can be used as an entry point for traversing the hierarchical data structure.

Each node 710 in the logical data object can be associated with one or more actions 730. An action 730 can comprise a definition for a logical operation that can be performed using the node 710 with which it is associated. The action 730 can contain an identifier that can be used to invoke the action's logical operation. Each node 710 in the logical data object can be associated with one or more determinations 740. A determination 740 can contain a definition for a logical operation that can be automatically executed when a trigger condition is fulfilled. Example trigger conditions can include a modification of the associated node 710, a modification of the data element 720 of the associated node, the creation of a data element 720 of the associated node, etc. A logical operation defined by an action 730, or a determination 740, can comprise instructions to create, update, read, and/or delete one or more data elements 720 and/or one or more sub-nodes 725. Actions 730 or determinations 740 can be set to trigger, in some cases, upon the occurrence of a particular date (e.g., a particular date or a particular time on a particular date).

Each node 710 in the logical data object schema 700 can be associated with one or more validations 750. A validation 750 can contain a definition of one or more data integrity rules and/or checks. The one or more data integrity rules and/or checks can be performed when the associated node 710, and/or one or more data elements 720 of the associated node, are created, modified, and/or deleted. Any such operation that does not satisfy the one or more data integrity rules and/or checks can be rejected.

Each node 710 in the logical data object schema 700 can be associated with one or more nodes from one or more other logical data objects (having the same schema or a different schema) by one or more associations 760. An association 760 can contain an identifier for a node in another logical data object that is associated with the node 710. Associations 760 can be used to define relationships among nodes in various logical data objects. The association 760, in at least some embodiments, contains an association type indicator that identifies a type of association between the node 710 and the node in the other logical data object.

Although the action 730 is defined and associated with the node 710, when the action 730 is invoked, it targets an identified instance of the node 710 with which it is associated. Similarly, a determination 740 and/or validation 750 can be defined and associated with a node 710, but can target an instance of the associated node 710 when it/they is/are invoked. Multiple instances of a given logical data object can be created and accessed independently of one another. Actions 730, determinations 740, or validations 750 may correspond to member functions of a data object, such as implemented in a C++ class.

Although the instances of the logical data object share a common schema 700, the data values stored in their respective node instances and data element instances can differ, as can the logical data object instances that are associated by the associations 760. Additionally, or alternatively, an instance of an association 760 can identify a particular instance of an associated node in another logical data object instance. The identifier of a node instance can be an alpha-numeric string that uniquely identifies the instance and, in at least some cases, can be used to look the instance up and/or retrieve data associated with the instance. Particular examples of identifiers include numerical values and universally unique identifiers. However, other types of identifiers are also possible.

Various actions may be performed using logical data objects including create, update, delete, read, and query operations. If the requested operation is a read operation, the data payload may contain a unique identifier associated with a logical data object instance to be retrieved. Processing a read operation request can comprise searching for an instance of the logical data object that is associated with the provided unique identifier in a data store, and retrieving all or part of a matching logical data object instance's data from the data store. If the requested operation is an update operation, the data payload may contain one or more values to be assigned to data element instances of an existing logical data object instance. The data payload may also contain a unique identifier associated with the logical data object instance to be updated. Processing an update operation request can comprise searching for a logical data object instance in a data store associated with the provided unique identifier and updating the matching logical data object instance with the provided data values.

Example 9—Example Relationships Database Schemas

Figure 8:
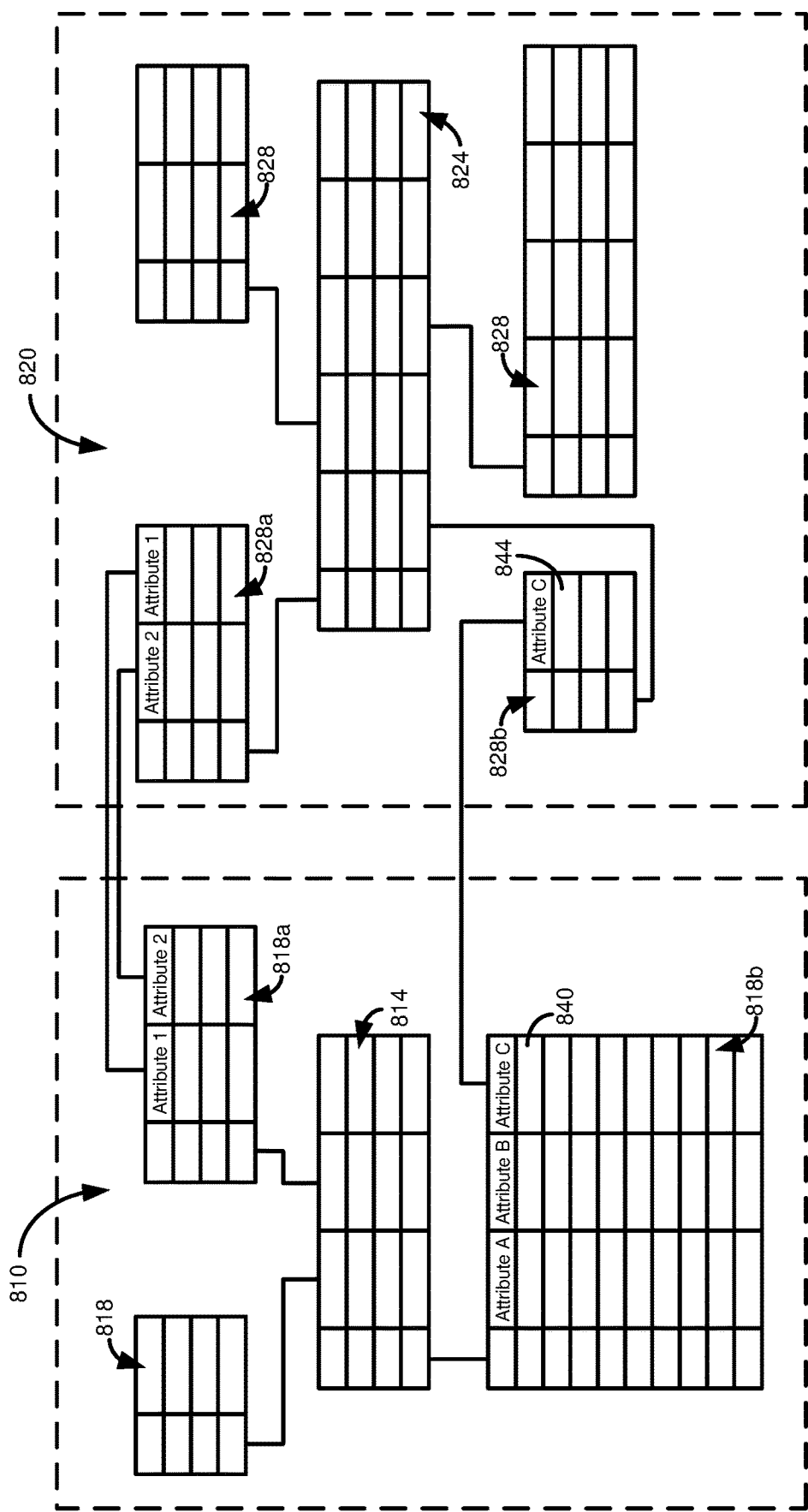
FIG. 8 is a diagram illustrating how different models or schemas can be related.

FIG. 8 schematically depicts two star schemas 810, 820. Star schema 810 includes a central fact table 814 and three dimension tables 818. Star schema 820 includes a central fact table 824 and four dimension tables 828.

In order to obtain data from multiple star schemas, a dimension table that is common to both fact tables is used to bridge the two schemas. In some cases, such bridging can occur if one dimension table is a subset of the other dimension table (e.g., one table contains all the attributes of the other, plus one or more additional attributes). In further cases, bridging can occur as long as at least one attribute is shared, or conformed, between the two star schemas.

For example, in FIG. 8, dimension table 818*a* is identical to dimension table 828*a* (other than, potentially, a record ID or other means of identifying tuples that does not convey substantive information). Or, rather than having duplicate tables, dimension table 818*a* and dimension table 828*a* can be the same table, but represented as members of multiple star schemas. Each attribute in the dimension tables 818*a*, 828*a* can serve as a pathway between facts in fact table 814 and facts in fact table 824. However, each of these pathways is different, in that different attributes are linked together. It can be important which attributes are used to link dimension tables 818*a* and 828*a*. For example, operations (e.g., specified by a SQL statement) to implement the pathways may be different. Additionally, some of the pathways may use indexed attributes, while others do not, which can affect the execution speed of a particular pathway.

In the example scenario of FIG. 8, an alternate way of obtaining facts from fact tables 814 and 824 is through the use of attribute 840 of dimension table 818*b* and attribute 844 of dimension table 828*b*. However, as shown in FIG. 8, table 818*b* includes a larger number of tuples than table 818*a*, which can result in a path involving table 818*b* having a longer execution time, and requiring more computing resources, than a path involving table 818*a*.

Example 10—Example Database System Useable in Implementing Disclosed Innovations Database systems commonly operate using online transaction processing (OLTP) workloads, which are typically transaction-oriented, or online analytical processing (OLAP) workloads, which typically involve data analysis. OLTP transactions are commonly used for core business functions, such as entering, manipulating, or retrieving operational data, and users typically expect transactions or queries to be completed quickly. For example, OLTP transactions can include operations such as INSERT, UPDATE, and DELETE, and comparatively simple queries. OLAP workloads typically involve queries used for enterprise resource planning and other types of business intelligence. OLAP workloads commonly perform few, if any, updates to database records, rather, they typically read and analyze past transactions, often in large numbers because OLAP processes can involve complex analysis of a large number of records.

Figure 9:
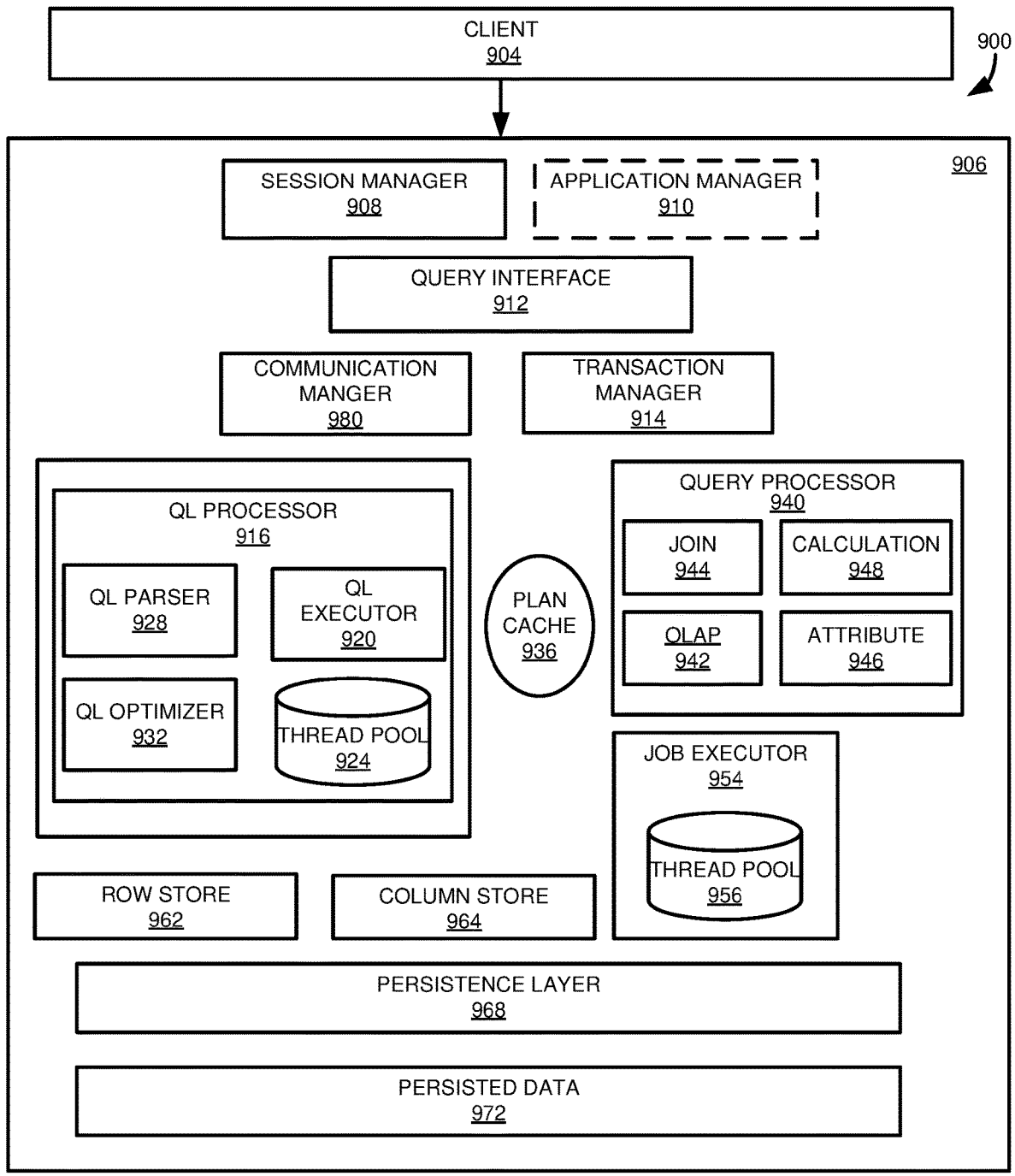
FIG. 9 illustrates an example database environment that can be used in disclosed techniques, including in identifying documents and document relationships.

FIG. 9 illustrates an example database environment 900. The database environment 900 can include a client 904. Although a single client 904 is shown, the client 904 can represent multiple clients. The client or clients 904 may be OLAP clients, OLTP clients, or a combination thereof.

The client 904 is in communication with a database server 906. Through various subcomponents, the database server 906 can process requests for database operations, such as requests to store, read, or manipulate data. A session manager component 908 can be responsible for managing connections between the client 904 and the database server 906, such as clients communicating with the database server using a database programming interface, such as Java Database Connectivity (JDBC), Open Database Connectivity (ODBC), or Database Shared Library (DBSL). Typically, the session manager 908 can simultaneously manage connections with multiple clients 904. The session manager 908 can carry out functions such as creating a new session for a client request, assigning a client request to an existing session, and authenticating access to the database server 906. For each session, the session manager 908 can maintain a context that stores a set of parameters related to the session, such as settings related to committing database transactions or the transaction isolation level (such as statement level isolation or transaction level isolation).

For other types of clients 904, such as web-based clients (such as a client using the HTTP protocol or a similar transport protocol), the client can interface with an application manager component 910. Although shown as a component of the database server 906, in other implementations, the application manager 910 can be located outside of, but in communication with, the database server 906. The application manager 910 can initiate new database sessions with the database server 906, and carry out other functions, in a similar manner to the session manager 908.

The application manager 910 can determine the type of application making a request for a database operation and mediate execution of the request at the database server 906, such as by invoking or executing procedure calls, generating query language statements, or converting data between formats useable by the client 904 and the database server 906. In particular examples, the application manager 910 receives requests for database operations from a client 904, but does not store information, such as state information, related to the requests.

Once a connection is established between the client 904 and the database server 906, including when established through the application manager 910, execution of client requests is usually carried out using a query language, such as the structured query language (SQL). In executing the request, the session manager 908 and application manager 910 may communicate with a query interface 912. The query interface 912 can be responsible for creating connections with appropriate execution components of the database server 906. The query interface 912 can also be responsible for determining whether a request is associated with a previously cached statement or a stored procedure, and calling the stored procedure or associating the previously cached statement with the request.

At least certain types of requests for database operations, such as statements in a query language to write data or manipulate data, can be associated with a transaction context. In at least some implementations, each new session can be assigned to a transaction. Transactions can be managed by a transaction manager component 914. The transaction manager component 914 can be responsible for operations such as coordinating transactions, managing transaction isolation, tracking running and closed transactions, and managing the commit or rollback of transactions. In carrying out these operations, the transaction manager 914 can communicate with other components of the database server 906.

The query interface 912 can communicate with a query language processor 916, such as a structured query language processor. For example, the query interface 912 may forward to the query language processor 916 query language statements or other database operation requests from the client 904. The query language processor 916 can include a query language executor 920, such as a SQL executor, which can include a thread pool 924. Some requests for database operations, or components thereof, can be executed directly by the query language processor 916. Other requests, or components thereof, can be forwarded by the query language processor 916 to another component of the database server 906. For example, transaction control statements (such as commit or rollback operations) can be forwarded by the query language processor 916 to the transaction manager 914. In at least some cases, the query language processor 916 is responsible for carrying out operations that retrieve or manipulate data (e.g., SELECT, UPDATE, DELETE). Other types of operations, such as queries, can be sent by the query language processor 916 to other components of the database server 906. The query interface 912, and the session manager 908, can maintain and manage context information associated with requests for database operation. In particular implementations, the query interface 912 can maintain and manage context information for requests received through the application manager 910.

When a connection is established between the client 904 and the database server 906 by the session manager 908 or the application manager 910, a client request, such as a query, can be assigned to a thread of the thread pool 924, such as using the query interface 912. In at least one implementation, a thread is associated with a context for executing a processing activity. The thread can be managed by an operating system of the database server 906, or by, or in combination with, another component of the database server. Typically, at any point, the thread pool 924 contains a plurality of threads. In at least some cases, the number of threads in the thread pool 924 can be dynamically adjusted, such as in response to a level of activity at the database server 906. Each thread of the thread pool 924, in particular aspects, can be assigned to a plurality of different sessions.

When a query is received, the session manager 908 or the application manager 910 can determine whether an execution plan for the query already exists, such as in a plan cache 936. If a query execution plan exists, the cached execution plan can be retrieved and forwarded to the query language executor 920, such as using the query interface 912. For example, the query can be sent to an execution thread of the thread pool 924 determined by the session manager 908 or the application manager 910. In a particular example, the query plan is implemented as an abstract data type.

If the query is not associated with an existing execution plan, the query can be parsed using a query language parser 928. The query language parser 928 can, for example, check query language statements of the query to make sure they have correct syntax, and confirm that the statements are otherwise valid. For example, the query language parser 928 can check to see if tables and records recited in the query language statements are defined in the database server 906.

The query can also be optimized using a query language optimizer 932. The query language optimizer 932 can manipulate elements of the query language statement to allow the query to be processed more efficiently. For example, the query language optimizer 932 may perform operations such as unnesting queries or determining an optimized execution order for various operations in the query, such as operations within a statement. After optimization, an execution plan can be generated, or compiled, for the query. In at least some cases, the execution plan can be cached, such as in the plan cache 936, which can be retrieved (such as by the session manager 908 or the application manager 910) if the query is received again.

For the purposes of the present disclosure, one task that can be performed by the query language optimizer 932 is determining a location where a request for a database operation, or a portion thereof, should be performed. For instance, a complex query may be submitted that reads data from multiple data sources. At least one of the data sources may be a virtual table, and the request can be performed on an anchor node, such as a node represented by a computing system implementing the database environment 900, or another node, including a node that was dynamically created in response to a request for a database operation, another request for a database operation, or based on overall workload/performance of a database system that include one or more nodes (that is, if a workload exceeds a threshold, a non-anchor node can be instantiated).

Once a query execution plan has been generated or received, the query language executor 920 can oversee the execution of an execution plan for the query. For example, the query language executor 920 can invoke appropriate subcomponents of the database server 906.

In executing the query, the query language executor 920 can call a query processor 940, which can include one or more query processing engines. The query processing engines can include, for example, an OLAP engine 942, a join engine 944, an attribute engine 946, or a calculation engine 948. The OLAP engine 942 can, for example, apply rules to create an optimized execution plan for an OLAP query. The join engine 944 can be used to implement relational operators, typically for non-OLAP queries, such as join and aggregation operations. In a particular implementation, the attribute engine 946 can implement column data structures and access operations. For example, the attribute engine 946 can implement merge functions and query processing functions, such as scanning columns.

In certain situations, such as if the query involves complex or internally-parallelized operations or sub-operations, the query executor 920 can send operations or sub-operations of the query to a job executor component 954, which can include a thread pool 956. An execution plan for the query can include a plurality of plan operators. Each job execution thread of the job execution thread pool 956, in a particular implementation, can be assigned to an individual plan operator. The job executor component 954 can be used to execute at least a portion of the operators of the query in parallel. In some cases, plan operators can be further divided and parallelized, such as having operations concurrently access different parts of the same table. Using the job executor component 954 can increase the load on one or more processing units of the database server 906, but can improve execution time of the query.

The query processing engines of the query processor 940 can access data stored in the database server 906. Data can be stored in a row-wise format in a row store 962, or in a column-wise format in a column store 964. In at least some cases, data can be transformed between a row-wise format and a column-wise format. A particular operation carried out by the query processor 940 may access or manipulate data in the row store 962, the column store 964, or, at least for certain types of operations (such a join, merge, and subquery), both the row store 962 and the column store 964. In at least some aspects, the row store 962 and the column store 964 can be maintained in main memory.

A persistence layer 968 can be in communication with the row store 962 and the column store 964. The persistence layer 968 can be responsible for actions such as committing write transactions, storing redo log entries, rolling back transactions, and periodically writing data to storage to provided persisted data 972.

In executing a request for a database operation, such as a query or a transaction, the database server 906 may need to access information stored at another location, such as another database server. The database server 906 may include a communication manager 980 component to manage such communications. The communication manger 980 can also mediate communications between the database server 906 and the client 904 or the application manager 910, when the application manager is located outside of the database server.

In some cases, the database server 906 can be part of a distributed database system that includes multiple database servers. At least a portion of the database servers may include some or all of the components of the database server 906. The database servers of the database system can, in some cases, store multiple copies of data. For example, a table may be replicated at more than one database server. In addition, or alternatively, information in the database system can be distributed between multiple servers. For example, a first database server may hold a copy of a first table and a second database server can hold a copy of a second table. In yet further implementations, information can be partitioned between database servers. For example, a first database server may hold a first portion of a first table and a second database server may hold a second portion of the first table.

In carrying out requests for database operations, the database server 906 may need to access other database servers, or other information sources, within the database system. The communication manager 980 can be used to mediate such communications. For example, the communication manager 980 can receive and route requests for information from components of the database server 906 (or from another database server) and receive and route replies.

Example 11—Example Chronological Document Display

Figure 10:
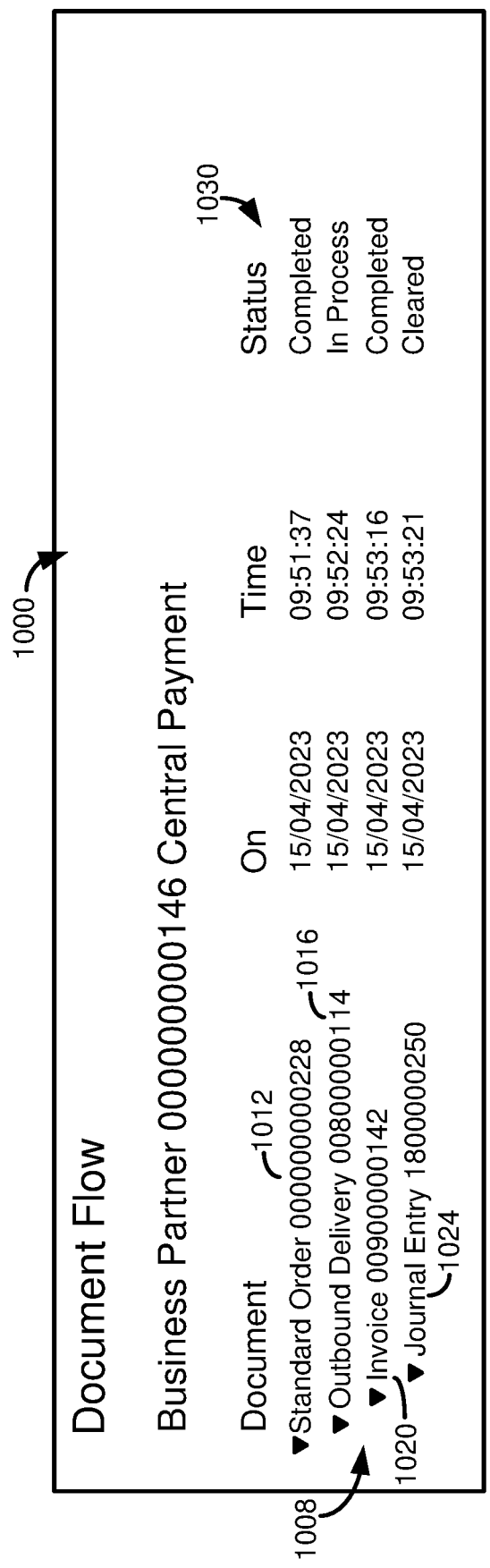
FIG. 10 illustrates an example chronological display of documents.

FIG. 10 illustrates a display 1000 of related documents over time. That is, the documents are ordered by times associated with the documents. It can be seen that the documents are in chronological order, and that the documents are arranged in a tree or hierarchy 1008. However, the display 1000 does not provide information about how the documents are related. In addition, although only a handful of documents are shown, in many cases a display could contain dozens of documents having a much more complicated hierarchical arrangement.

The documents in the display 1000 include an order document 1012, a document 1016 reflecting delivery of items requested in the order, an invoice 1020 that was generated as part of satisfying the order, and a journal entry 1024, which can indicate, for example, payment of the invoice.

In the case of the documents 1012-1024, it may be possible to understand the relationships between the documents, assuming that all of the documents relate to a common transaction, which was initiated through the order document 1012. However, the display 1000 provides a column 1030 that provides "status" information for each document 1012-1024. The status column 1030 provide a status of "completed" for documents 1012 and 1020, but the display 1000 does not explicitly indicate what caused those documents to have that status. Similarly, document 1024 has a status of "cleared," but it may not be clear why that document is "cleared."

As mentioned, the scenario illustrated in the display 1000 can be considered to be a fairly simple example for a variety of reasons. For example, only a small number of documents are shown, and those documents are for a single transaction. At least in some cases, when documents are displayed chronologically, documents for different transactions can be interleaved, which can make it much more difficult to understand how the transaction has progressed, and how various documents relate. The documents 1012-1024 also have a comparatively simple set of relationships. In many practical examples, there can be many more types of documents with more types of relationships, including relationships that are more nuanced than in this simple illustrative example.

Example 12—Example Documents and Document Relationships

Figure 11A:
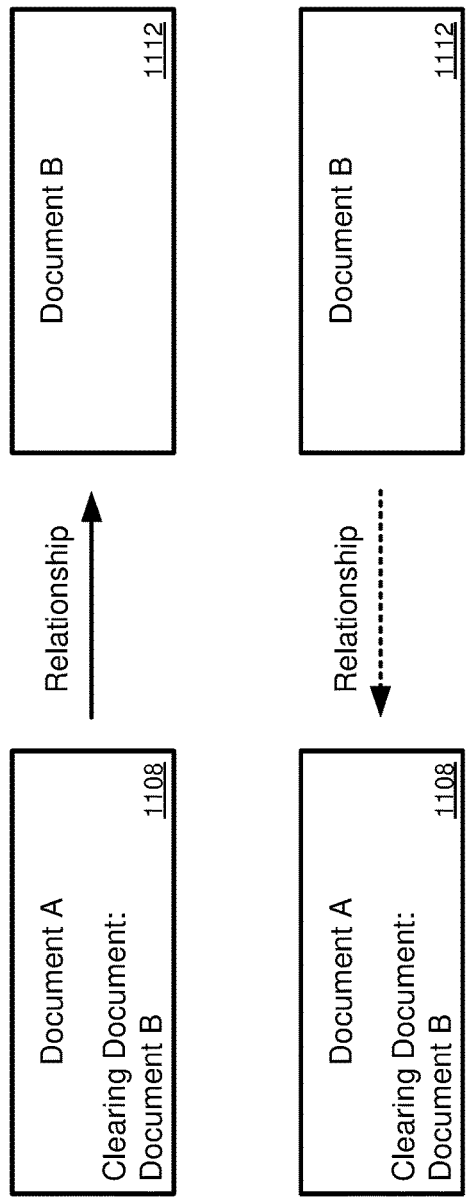
FIG. 11A illustrates an example of how documents can be related, including how relationships can be considered from the point of view of either document in a relationship.

FIG. 11A illustrates how documents can be related. For example, Document A, 1108, has a relationship with Document B, 1112. In many cases, a relationship can be looked at from the point of view of either of the documents. So, Document B, 1112, is also shown as having a relationship with Document A, 1108. The relationships can be the inverse of one another, including where one relationship is considered to be an "active" relationship and the other relationship is considered to be a "passive" relationship.

For example, if Document A, 1108, is considered as "replicating to" Document B, 1112, Document B can be considered as being "replicated from" Document A. Or, say Document A, 1108, performs an action on Document B, 1112, such as reversing an effect resulting from Document B. In this case, Document A, 1108, could be considered as "reversing" Document B, 1112, and Document B could be considered as being "reversed by" Document A.

A document relationship can be determined in a variety of ways. For example, Document A, 1108, is shown as including information identifying Document B, 1112. This information may be expressed in an attribute of the document that also is useable to identify the relationship between Document A, 1108, and Document B, 1112. Or, the nature of the relationship can be expressed in another attribute of Document A, 1108, or in an attribute of Document B, 1112. A document can have an attribute that indicates a status and an attribute that identifies another document or documents giving rise to the status. Optionally, Document B, 1112, can also include an attribute that is usable to identify that a relationship exists with Document A, 1108.

In another example, related documents, and optionally information about the nature of the relationship between related documents, can be determined from another document. For example, consider that a Document D (not shown in FIG. 11A) includes identifiers for both Document A, 1108, and Document B, 1112. Document D can thus be used to generate the relationship shown in FIG. 11A. The nature of the attributes that identify the documents 1008, 1112 can be used to identify a relationship type between the documents. Or, the nature of the document (Document D) that contains identifiers of the related documents 1108, 1112, can be useable to define the relationship type.

In a further example, an additional document can be indirectly used to establish a relationship between two documents. Consider that both Document A, 1108, and Document B, 1112 both reference a Document E (not shown in FIG. 11A). The fact that both documents reference a common document, Document E, can be used to establish a relationship between Document A, 1108, and Document B, 1112. The nature of Document E can, at least in some cases, also be used to establish a relationship type between Document A, 1108, and Document B, 1112.

In practice, and as will be further described, a given process can include many document types, with many types of relationships between a particular pair of document types. In some cases, a given document type can have relationship with multiple document types, and in some of those cases the relationship types can be different.

Figure 11B:
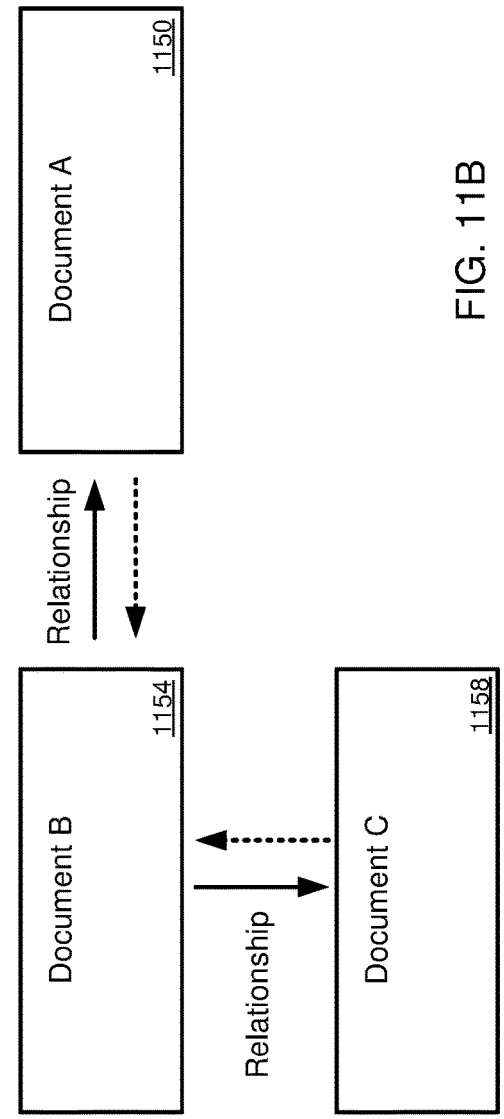
FIG. 11B illustrates how a document can have relationships with multiple documents.

FIG. 11B illustrates how a document can be related to multiple other documents, including documents having different types of relationships. Assume that Document B, 1154, was cleared by Document A, 1150. Document B, 1154, can thus be put into a "cleared" status. However, the clearing action might be undone by Document C, 1158. The relationship between Document B, 1154, and Document C, 1158, can be considered a "clearing" or "reset" of the original clearing of Document B, 1154, by Document A, 1150.

Example 13—Example Relationship Types

As described in Example 12, a pair of document types can have a relationship, and the relationship can be viewed, and described, from the point of view of each document. FIG. 12 illustrates a table 1200 listing different types of relationships (as rows of the table), including from the point of view of two documents in a given relationship. The "active" version of the relationship is shown in the left column, 1212, while the "passive" version of the relationship is shown in the right column, 1216. The relationships can have meanings as used in products available from SAP SE of Walldorf, Germany, such as S/4 HANA (such as the finance functionality) or SAP Central Finance, which can incorporate data from multiple financial software instances, including those of companies other than SAP.

While the relationships and description of the table 1200 provide a useful illustration of a particular scenario in which disclosed techniques can find use, for purposes of the present disclosure, it may be sufficient to note that multiple relationship types are possible, and that they can be viewed from the point of view of either document type. It should be further noted that a given set of document types, and instances of such document types, can be included in an overall process that has multiple subprocess, or a use case with multiple independent processes, where the subprocesses or independent processes can have their own set of relationship types, including for at least some document types that are common between the subprocesses or independent processes. When a display of document information includes documents from multiple subprocesses or independent processes, it can be particularly difficult to understand the information in the display, particularly if the documents are displayed only in chronological order. Techniques of the present disclosure can address these shortcomings.

Example 14—Example Document Hierarchies

Figure 13:
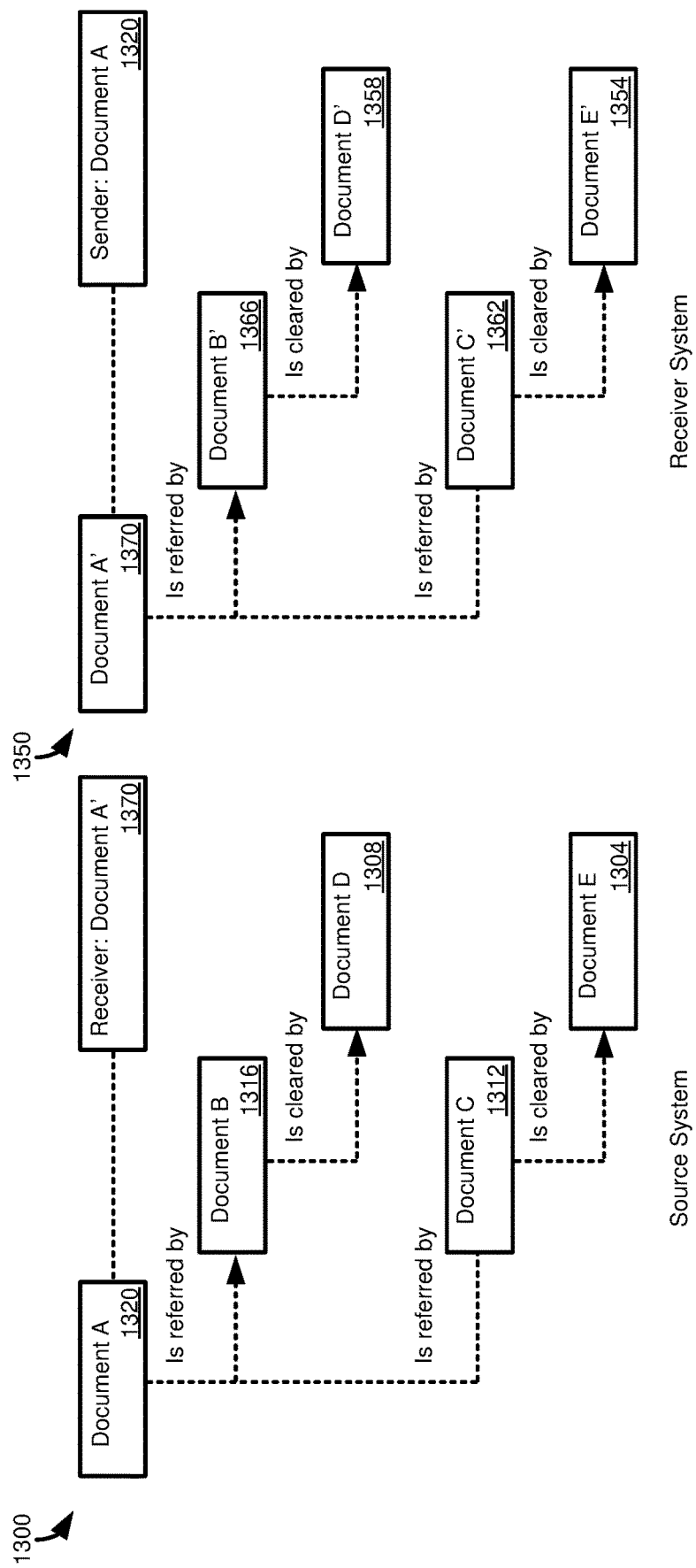
FIGS. 13A and 13B illustrate how a hierarchy of document relationships can be present at multiple computing systems.

FIGS. 13A and 13B are hierarchical listings (such as a tree hierarchy) of related documents. FIG. 13A represents a hierarchy 1300 at a source system, while FIG. 13B represents a hierarchy 1350 at a receiver system. In particular, FIG. 13A can represent data in a source financial system, while FIG. 13B can represent data that is sent, such as being replicated, from the source financial system to the receiver system.

FIG. 13A and FIG. 13B can represent displays that can be provided to a user to help a user better understand relationships between documents. For example, rather than presenting documents in a chronological order (or, at least strictly in a chronological order), FIGS. 13A and 13B present documents organized with respect to particular relationships between documents, and information about the relationships can be shown, which can help a user better understand how documents are related and a process that includes the documents.

In FIG. 13A, consider that Document D, 1308, is associated with a date after Document C, 1312, and that Document C has a date after a date of Document B, 1316. Simply showing the documents in chronological order may make it harder to understand the relationships between Document A, 1320, Document B, 1316, and Document D, 1308, as Document C would be placed between Documents B and D. In addition, the information in FIGS. 13A and 13B can represent a filtered list of relationships, where some documents may not be displayed at all if they are not included in a set of relationships to be analyzed, or otherwise do not satisfy hierarchy generation rules.

The documents and relationships in the displays 1300 and 1350 are generally similar, including in that the relationship are described in a "passive" way, from the point of the document affected by the actions of another document. As for the relationship, source and target copies 1320, 1370 of Document A, A' have relationships with both Document B, B' 1316, 1366, and Document C, C', 1312, 1362. In each case, Document A, A' 1320, 1370 is referred to by the related documents, B, B', 1316, 1366, and C, C', 1312, 1362. Documents B, B' 1316, 1366 and C, C' 1312, 1362 are cleared by Documents D, D' 1308, 1358 and Documents E, E' 1304, 1354, respectively.

Note that the hierarchies 1300, 1350 also include relationships between documents at the source and the receiving systems. In this case, in the hierarchy 1300, Document A', 1370, is shown as being a receiver of Document A, 1320, sent from the source system. Correspondingly, in the hierarchy 1350, Document A, 1320, is shown as having a "sender" relationship with Document A', 1370.

Having the hierarchies 1300, 1350, and links therebetween, can be useful for a variety of purposes, including to confirm whether the documents and relationships are consistent between the systems. In addition, when the documents are associated with status information, the hierarchies 1300, 1350 can be used to determine whether documents in the hierarchies have the same states, which can be used, for example, to determine whether there may processing issues at a receiver system.

In yet further cases, a document can be sent from the source system to the receiver system, where it can undergo further processing, including having relationships that are part of the receiver system but are not part of the source system.

Example 15—Example Document Search Processes

Providing displays of documents that includes relationship information can be, by itself, quite useful. Disclosed techniques also include search algorithms that can provide document information that is targeted to the needs of a user or a particular user computing process. As will be described, the search process can be performed in one of two ways, or a search can be performed that combines both approaches. In particular, a document can be specified as well a search direction, where the search direction indicates whether documents that are "upstream" of the specified document are of interest, or whether documents that are "downstream" of the specified document are of interest.

Figure 14:
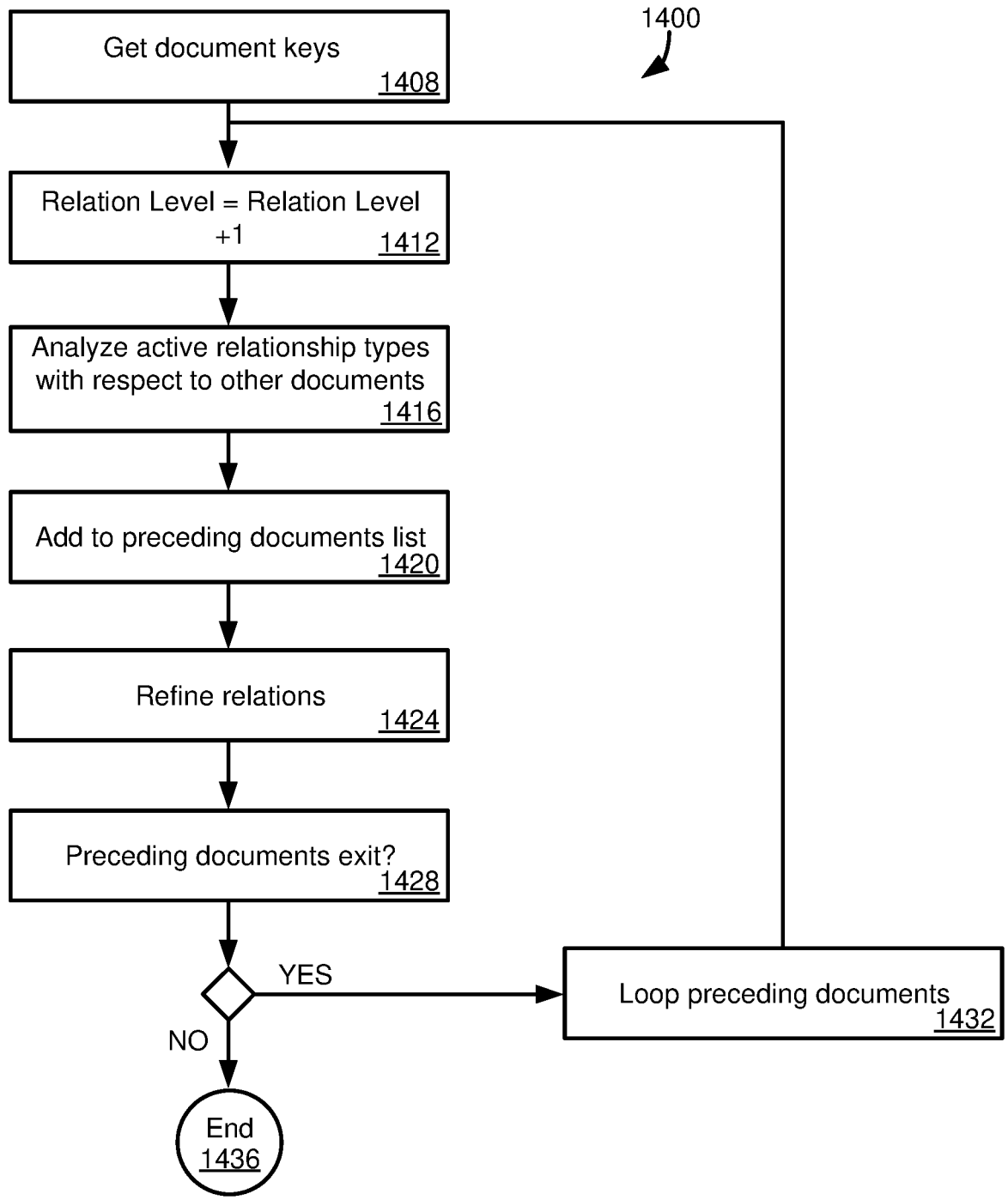
FIG. 14 is a flowchart of a process for conducting a search for upstream documents.

FIG. 14 illustrates a process 1400 for identifying documents upstream of a specified document. That is, the process 1400 of FIG. 14 identifies documents occurring earlier in a sequence that resulted in the creation or linkage of a particular document to another document, or an overall sequence/process associated with the sequence. Or stated another way, the upstream search involves active relationships—looking for documents upstream that were affected by a particular downstream document being analyzed.

An identifier of a particular document is received at 1408. For example, the document can be associated with a unique, single value identifier (for example, a UUID), or the document can be associated with multiple attributes, and one or a combination of values for one or more attributes can serve to uniquely identify the document, such as a key (which can be a primary key), as that term is used in the field of relational databases. In a particular example, the document is stored in one or more relational database tables, and the identifier is a key that identifies the document, which can be formed from multiple attributes/columns of a table. Since later documents typically affect earlier documents, the identifier of the document 1408 is used to search for upstream documents on which the identified document had an effect, and so the relationships are "active" relationships.

The process then looks for documents related to the specified document at a first "relationship level." The relationship level can represent one or both of a degree of indirection or a relationship type. At 1412, a relationship level is set. During an initial analysis, the relationship level can have a starting value (e.g., 0 or 1, where those values can be correlated with a particular relationship type, which can represent a most direct relationship/lowest degree of indirection). Since multiple levels of relationships can exist, the process 1400 is typically carried out for multiple levels. In such cases, 1412 can include incrementing a relationship level, which can correspondingly involve looking at a new relationship type, or can include looking at a same relationship type, but at a different level/degree of indirection.

At 1416, the given relationship type/degree of indirection set at 1412 can be analyzed to determine other documents satisfying the relationship. Since the process 1400 is an "upstream" process, the specified document has an "active" relationship with the upstream documents, either directly or indirectly. The later documents were affected by some action of the specified document, or a document upstream of the specified document that is being analyzed with respect to documents that are further upstream. If upstream documents are found, they are added to a list of preceding documents at 1420.

Relationships can be refined at 1424. A process for refining relationships is described in Example 16.

If preceding documents exist, such as after being added to the list at 1420 and remaining after any refining at 1424, they can be analyzed by looping the process 1400 at 1432, by returning to 1408, to look for additional preceding documents at a next level of indirection or a next relationship type. The process 1400 can continue until no more preceding documents are found at 1428, in which case the process can terminate at 1436.

Earlier process termination criteria can be defined, or other process rules configured. In some cases, process termination can be indicated when a maximum level of indirection has been reached (which can be a general threshold, or specified for a particular initial document or a document type) or when a particular document, document type, or relationship is encountered. Process configuration can include specifying what relationships to follow or a sequence in which relationships should be analyzed (such as a relationship priority).

Figure 15:
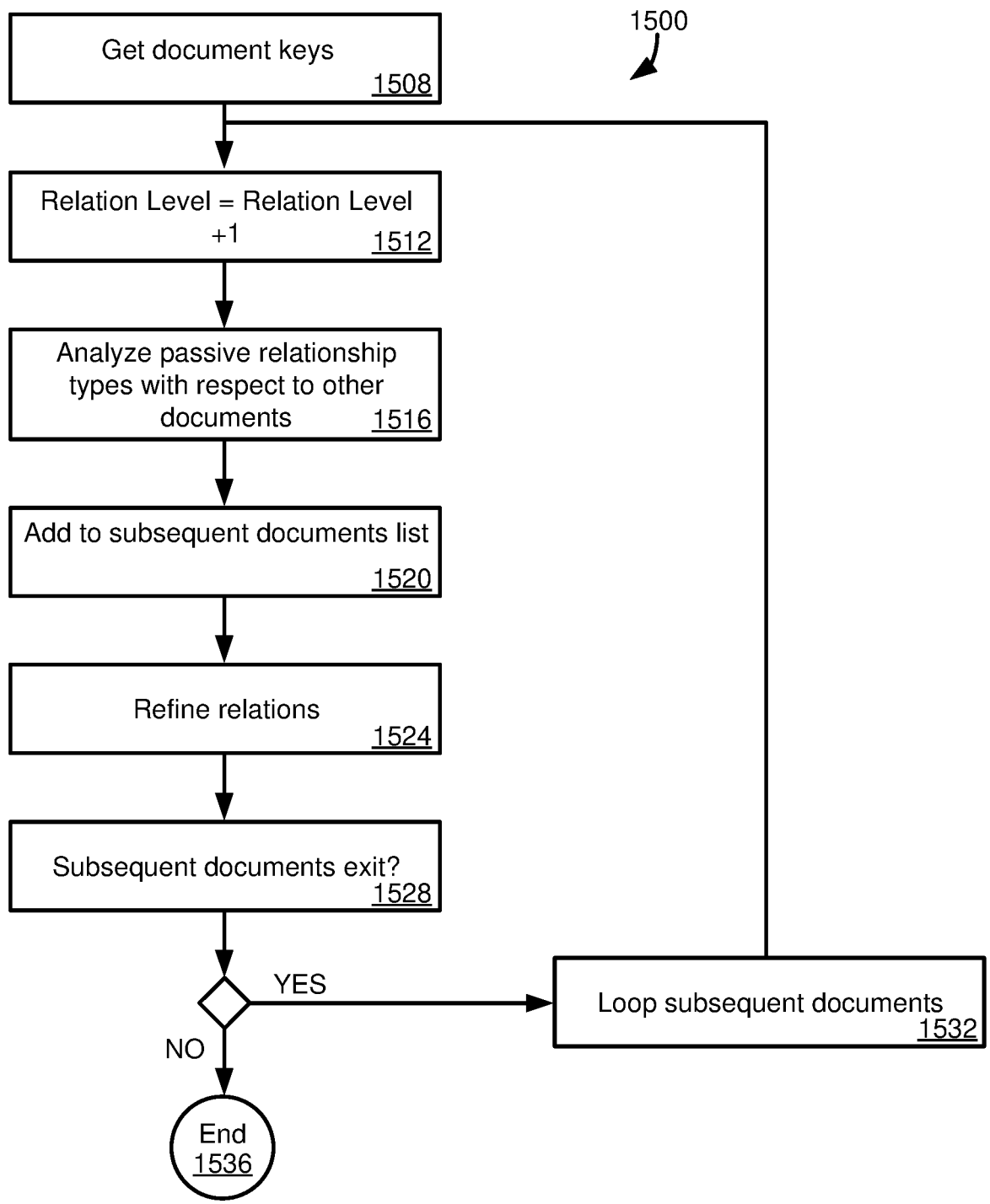
FIG. 15 is a flowchart of a process for conducting a search for downstream documents.

FIG. 15 illustrates a downstream search process 1500 to locate documents downstream of a given document. While the process 1400 of FIG. 14 looks at "active relationships" of the given document, the process 1500 of FIG. 15 looks at "passive relationships." Otherwise, the process 1500 of FIG. 15 includes operations 1508-1536 that can be implemented in a similar manner as described for the corresponding operations 1408-1436 of the process 1400 of FIG. 14.

Figure 16:
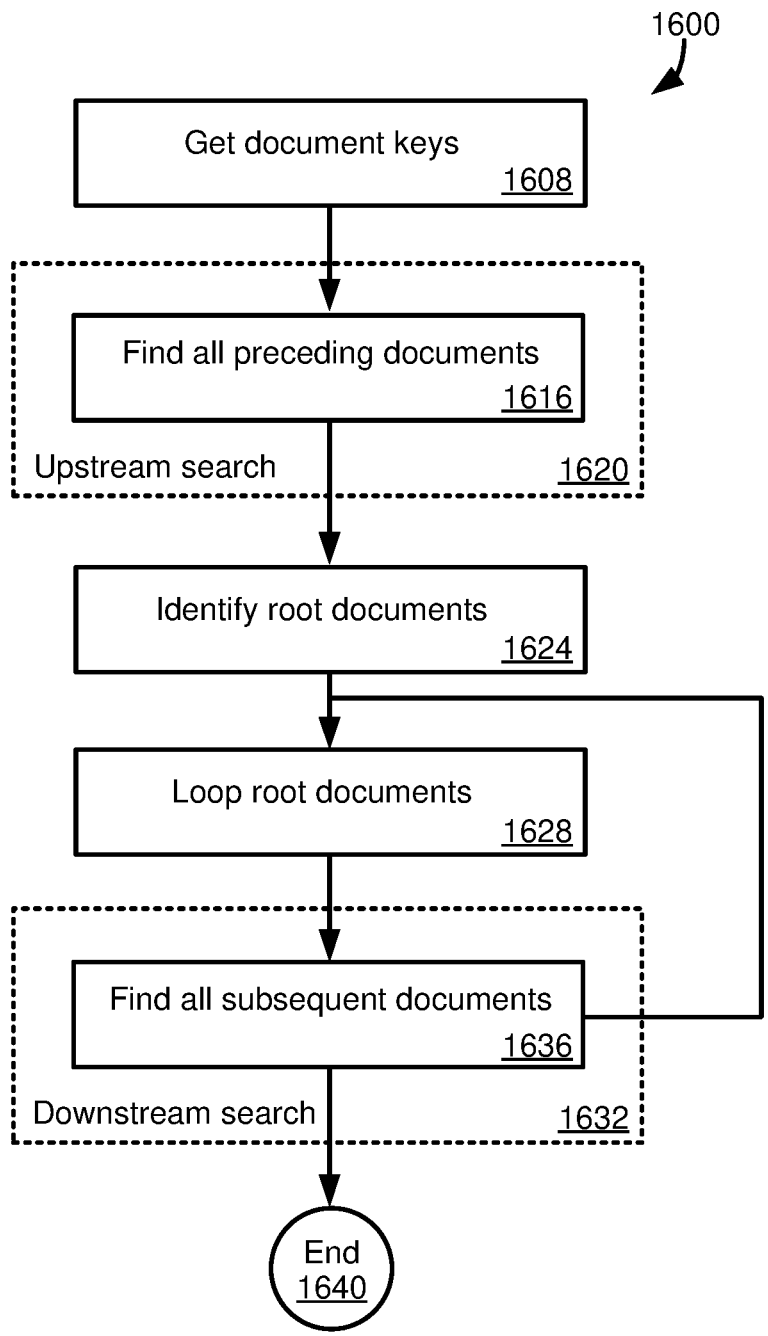
FIG. 16 is a flowchart of a process for a combined upstream and downstream search technique.

FIG. 16 illustrates a process 1600 where documents both upstream and downstream of a given document are searched. The upstream and downstream search processes can be implemented as shown in FIGS. 14 and 15.

At 1608, one or more document keys are received for documents to be analyzed, which can be implemented in an analogous manner as operations 1408 and 1508. Documents upstream of the given document are identified at 1616 as part of an upstream search process 1620 (which can be the process 1400). All or a portion of those documents can be indicated for a downstream search, optionally along with searching for documents directly downstream from the documents whose identifiers were provided at 1608.

In particular cases, at 1624, one or more documents upstream of the given document can be identified as "root" documents, and then a downstream search can be conducted for all or a portion of the root documents. For example, a next root document to be analyzed can be determined at 1628. Documents downstream (subsequent) to a root document can be identified at 1636, as part of a downstream search process 1632 (such as the process 1500). If additional root documents remain to be analyzed after 1636, the process 1600 can return to 1628. Otherwise, the process 1600 can end at 1640.

Root documents can be defined, and identified based on such definitions, in a number of ways. In one way, a root document is defined as a document that has no preceding documents. In other scenarios, a root document can be defined as having a particular type, or having a threshold number of indirections from the given document or another document upstream (or optionally downstream) from the given document.

Figure 17:
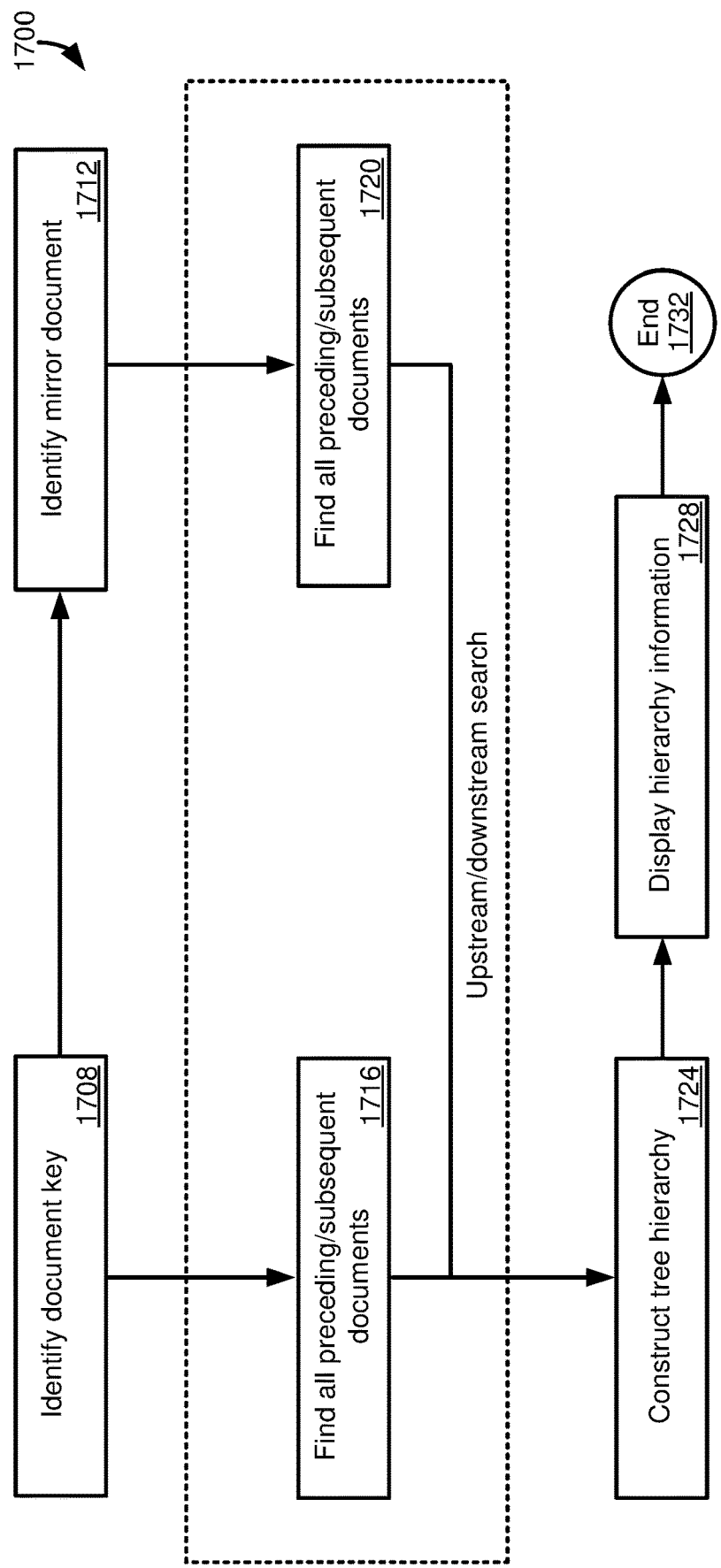
FIG. 17 is a flowchart of a process for conducting a document flow analysis at multiple computing systems.

In some cases, it can be useful to compare documents of two systems. For example, as described with respect to FIGS. 13A and 13B, a document can be sent/replicated from a source/sender to a target/receiver. It may be useful to compare the hierarchies of the two systems, such as to determine whether the systems have the same content, or ways in which the content may differ between the systems. FIG. 17 illustrates an example process 1700 for obtaining hierarchies for two systems with respect to a given source document.

A document key is provided at 1708, which can be implemented as described with respect to operation 1408 of the process 1400 of FIG. 14. Using the document key, the mirror of that document is found in another computing system or data repository at 1712. For both the document and the mirror, preceding documents, subsequent documents, or a combination thereof, are found, at 1716, 1720, respectively, such as using a process 1400, 1500, 1600 of FIG. 14, 15, or 16.

Once the data is obtained, a tree hierarchy can be constructed at 1724, which captures relationships between preceding and subsequent documents for the source system and the receiver system. Information about the hierarchy can optionally be presented, such as in a user interface display, at 1728. In some cases, the presentation can be similar to FIGS. 13A and 13B, where separate visualizations are provided for each starting document/system. In other cases, information for both source documents can be provided in a common tree. If discrepancies are identified between the two source documents, such differences can be indicated on the visualization. The process 1700 can then end at 1732.

Figure 18:
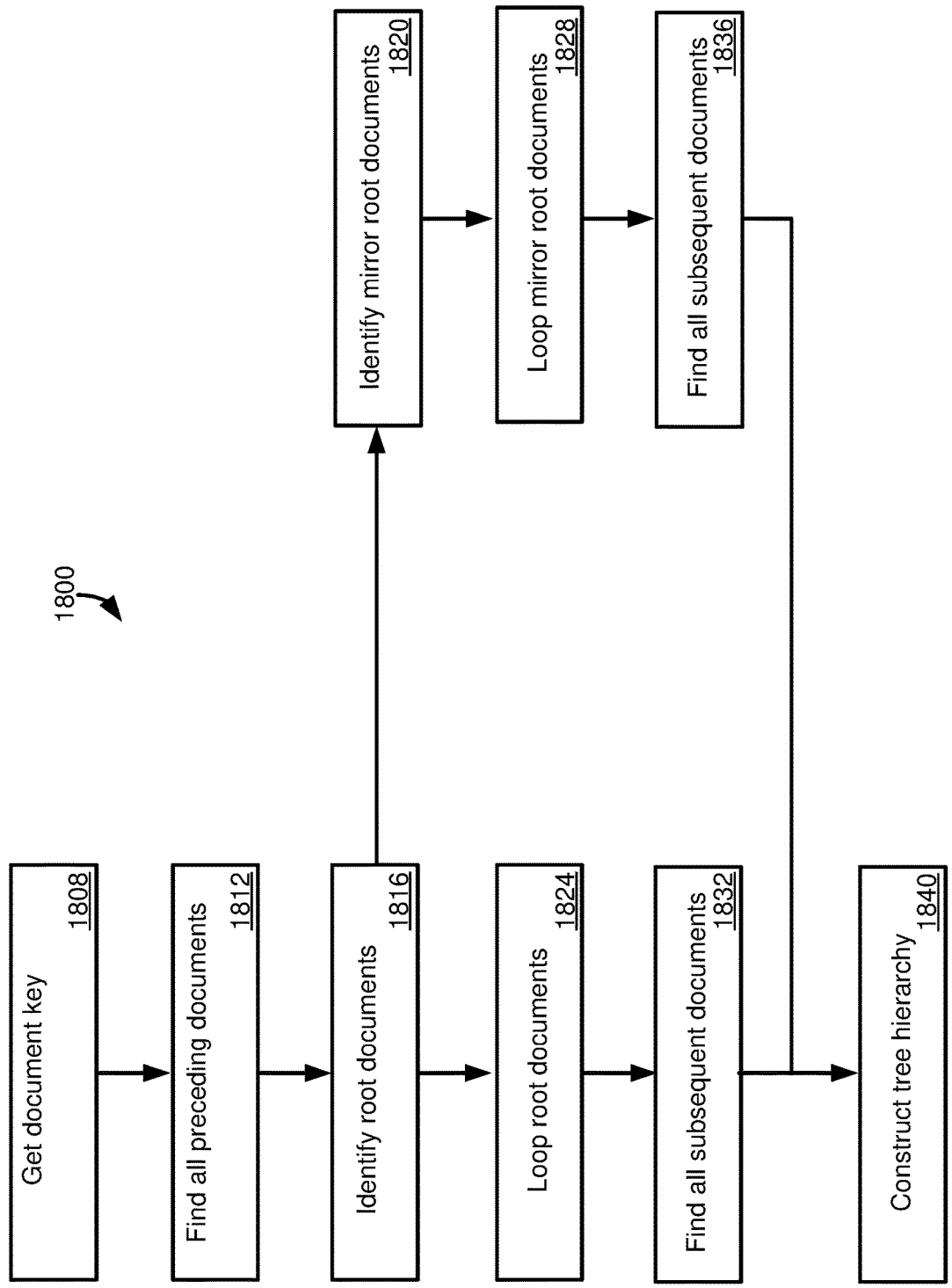
FIG. 18 is a flowchart of a process for conducting a combined upstream and downstream search at multiple computing systems.

FIG. 18 illustrates a process similar to that in FIG. 17, but which also includes a combined upstream/downstream search that identifies and processes root documents. The process of FIG. 18 can be similar to those described in FIGS. 14-17. Note that in both FIGS. 17 and 18 there is at least one linkage between the two systems/repositories, such as a document that is sent/replicated to a target system.

One or more document keys are obtained at 1808, which can be implemented in an analogous manner to operation 1408 of the process 1400 of FIG. 4. For the identified document(s), upstream documents are identified at 1812, which can be implemented in a similar manner as the process 1400. Root documents are identified at 1816, which can be implemented as described for operation 1624 of the process 1600 of FIG. 16. At a receiver/second system, documents (mirrors) of the root document can be identified at 1820, such as by using document keys of the root documents. The root documents at the source and receiver systems can then be looped at 1824, 1828, to find subsequent documents at 1832, 1836. Finding subsequent documents can be implemented as described for the process 1500 of FIG. 15. A tree hierarchy can then be constructed at 1840, which can be implemented as described for operation 1724 of the process 1700 of FIG. 17.

In some cases, an initial tree hierarchy can be constructed, and then supplemented with additional information. In particular, status information can be added for particular documents, including those resulting from links/relationships to other documents.

Figure 19:
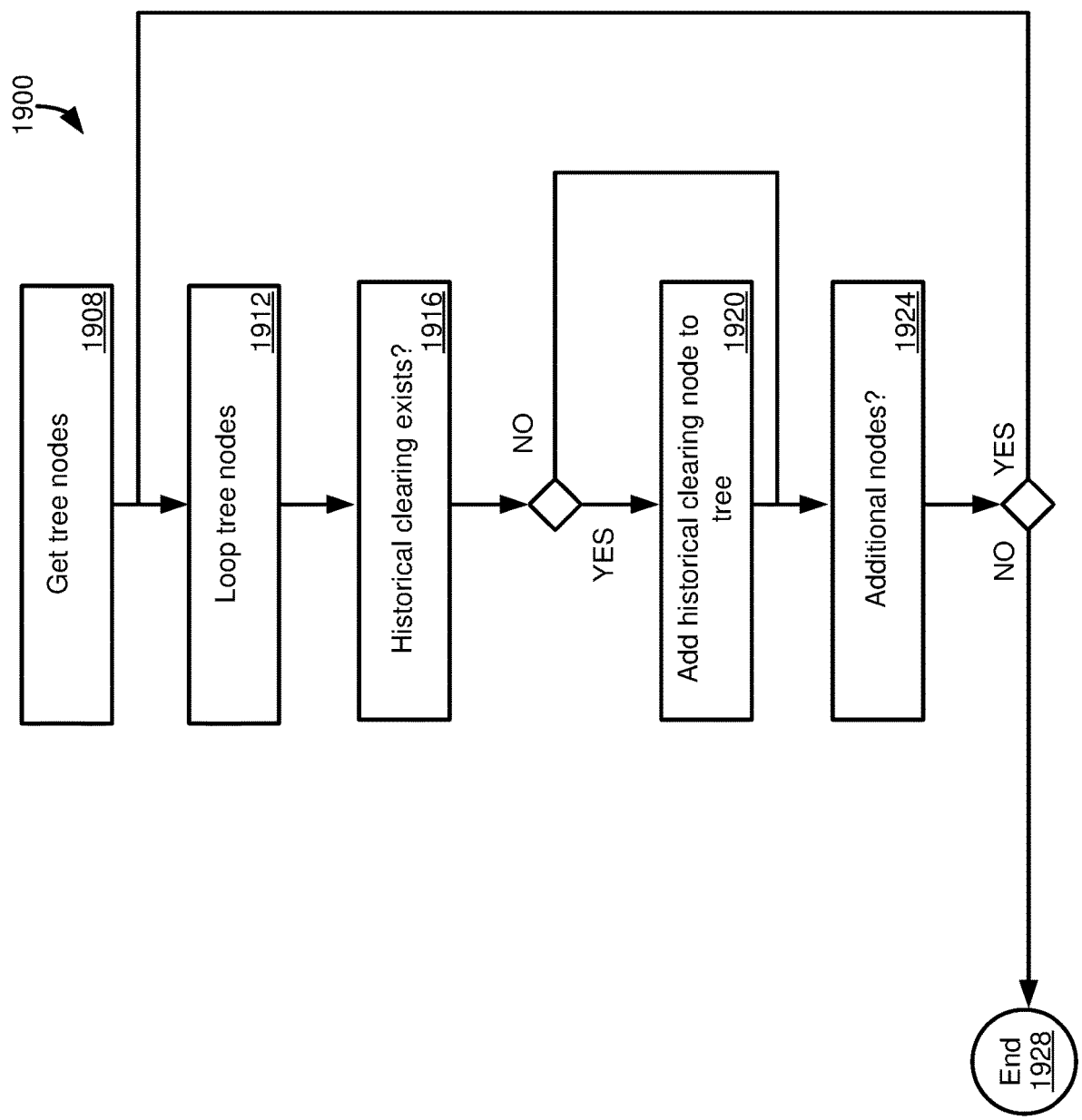
FIG. 19 is a flowchart of a process of supplementing a document tree with additional information, including additional documents having a relationship with a document of the document tree.

Assume that a tree hierarchy has been obtained, which has documents that form nodes of the hierarchy. FIG. 19 illustrates a flowchart of a process 1900 for determining whether a particular document has been "cleared." In the context of financial transaction processing, "clearing" can refer to a linkage between an invoice and a payment of the invoice.

All or a portion of the nodes in the hierarchy can be evaluated progressively, such as evaluating documents that have a possible status of being "cleared"/a "clearing" relationship with another document. If a second document is found that has a clearing relationship with a first document in the hierarchy, the second document can be added to the hierarchy, including with a relationship to the first document.

More particularly, tree nodes to be evaluated are obtained at 1908. The tree nodes are looped for analysis at 1912. At 1916, it is determined if a historical clearing exists. If not, the process 1900 proceeds to 1924. If a historical clearing does exist, the clearing (for example, an indication of the clearing, or a relationship to a document associated with the clearing) is added to the tree as a node at 1920. At 1924, it is determined whether additional nodes remain to be analyzed. If so, the process 1900 returns to 1912. Otherwise, the process 1900 ends at 1928.

FIGS. 20A, 20B, and 20C illustrate example code that can be used to implement a downstream search process, an upstream search process, and a combined upstream and downstream search process, respectively.

Example 16—Example Relationship Refinement and Example Displays of Document Relationships FIG. 21 is an example user interface screen that allows users to view, define, update, or delete relationship types. Note that values beginning with a letter indicate "active" (upstream) relationships, while values beginning with a number indicate "passive" (downstream) relationships.

Earlier processes can include a step of "refining relationships." In one aspect, refining relationships can refer to prioritizing relationships in generating a hierarchy or a visualization thereof. FIG. 22 illustrates example relationship types and example relationship priority values associated therewith. Prioritization rules can be used to determine how a hierarchy is formed, where priorities can determine a branching order. In some cases, prioritization rules can also result in some relationships being omitted, or relationships exceeding a threshold level of indirection being omitted.

Figure 23A:
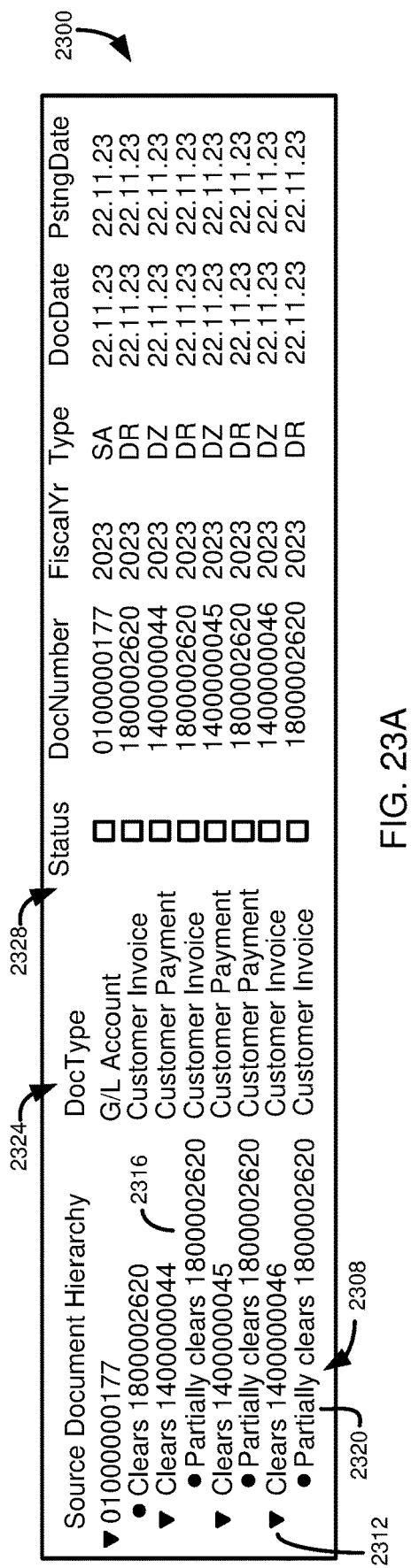
FIGS. 23A and 23B are example displays of downstream and upstream document flow analysis results.
Figure 23B:
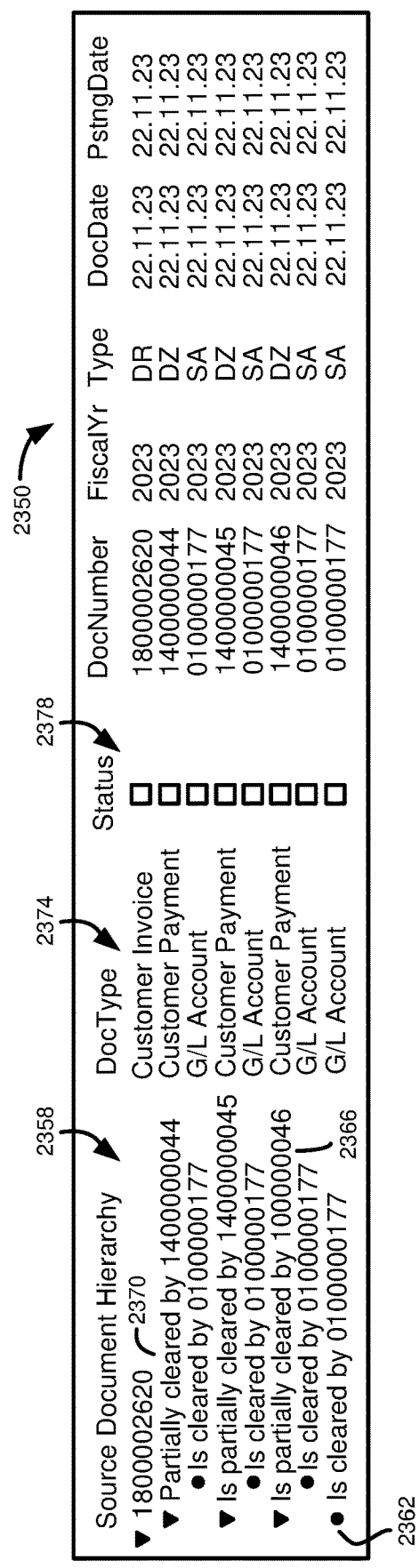

FIGS. 23A-23B are displays 2300 and 2350 of portions of hierarchy visualizations that can be generated and displayed using disclosed techniques. FIG. 23A is example upstream search results, using document 0100000177 as a starting point. FIG. 23B combined upstream/downstream search result that can also use document 0100000177 as a starting point, and where document 180000260 serves as a root document. The root document, 180000260, is listed at the top of the hierarchy, and then documents downstream of both the root document and the initially provided document identifier are displayed lower in the hierarchy.

The displays 2300, 2350 of FIG. 23A and FIG. 23B provide a variety of useful information. The displays have columns 2308, 2358 that display the tree hierarchy information, including in a manner that allows branching levels to be determined. Entries 2312, 2362 typically include both a document identifier 2316, 2366 and a relationship description 2320, 2370 associated with the document identifier. Another column 2324, 2374 provides a document type for the related document. In some cases, documents in a tree can be associated with various errors, such as where data between two related documents may not match, where data is not properly replicated between systems, or because an expected document status is not present. This information can be provided in a status column 2328, 2378, which can include colors or symbols to indicate whether data is as expected or whether an error may be present. To help provide additional information regarding documents in the hierarchy, a display can include information about one or more attributes of a given document, such as a time period associated with the document, a date the document was entered or created, or a posting date.

Example 17—Example Identification and Display of Documents Having "Neutral" Relationships Prior Examples have described how documents can have active/passive relationships, and how these relationships can be identified, traversed, and used to create various displays of document relationship information. In some cases, it can be useful to provide information about documents that may have different kind of relationship. That is, some document relationships can be described as "neutral," rather than being active or passive.

In at least some cases, documents have a neutral relationship may not be included in data sources, such as relational database tables, used to construct upstream or downstream document flows based on active/passive relationships. In such cases, alterative techniques can be used to find neutrally related documents. As an example, consider that certain documents are replicated from/based on a same source document. That is, a number of documents may reference a source document. Some of the documents can be documents that have an active or passive relationship with the source document, and information about these documents may be located in a first set of one or more data sources, and other documents can be documents having a neutral relationship with the source document, and information about these documents may be located in a second set of one or more data sources. In at least some scenarios, at least some data sources between the first set and the second set do not overlap.

One example of documents having a neutral relationship can include a document that adds a temporary posting associated with a particular source document and a document that removes the temporary posting. Another example of documents having a neutral relationship can include a document that attempts to correct a source document, but results in an invalid document, and a document that reverses the correction. The pairs of documents in these scenarios can represent documents that "cancel out" one another.

Figure 24:
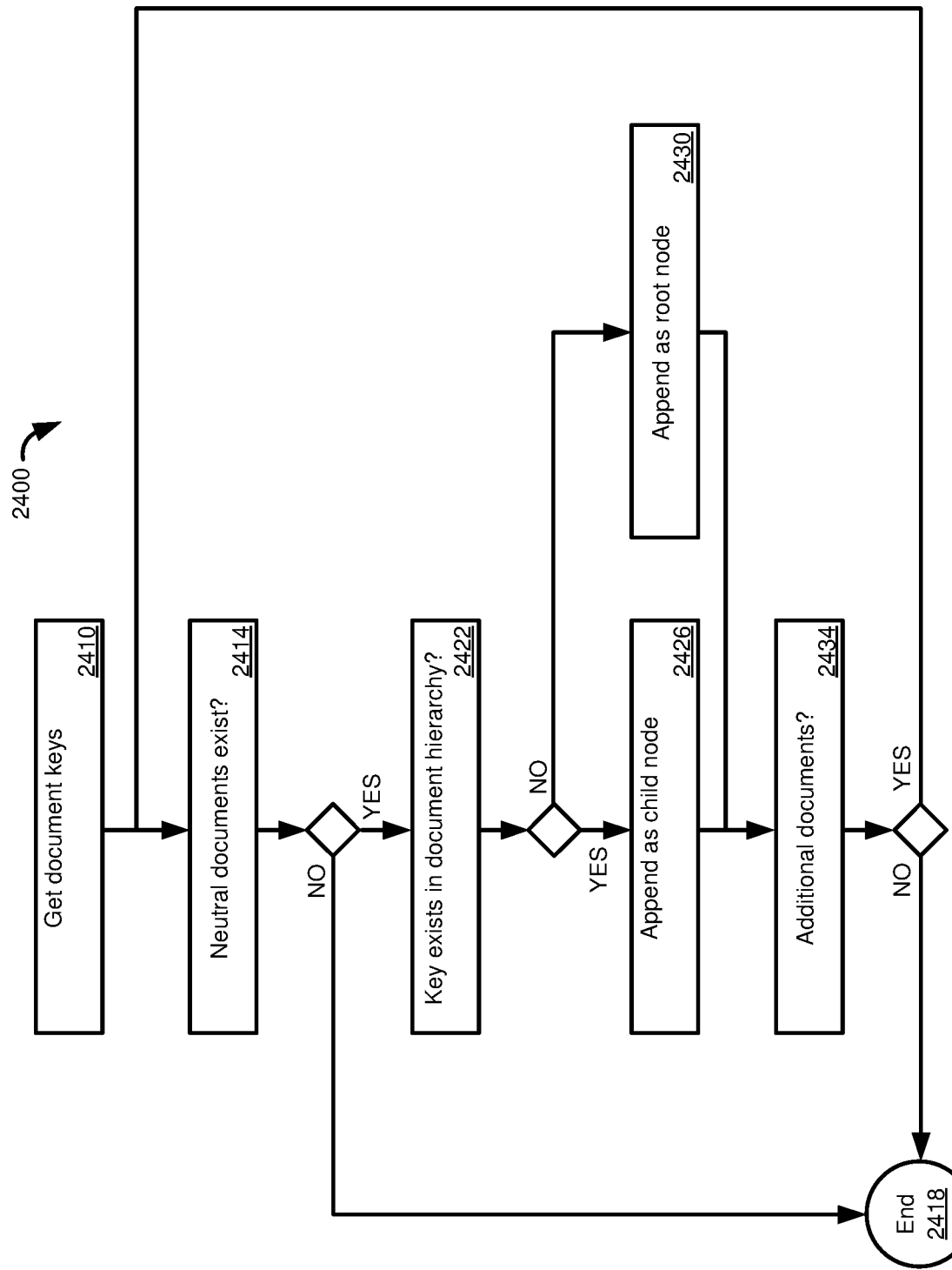
FIG. 24 is a flowchart of a process for supplementing a document hierarchy with documents having a neutral relationship with a document of the document hierarchy.

FIG. 24 is a flowchart of an example process 2400 for supplementing results, such as a document flow analysis/document hierarchy, of an upstream and/or downstream search process with information regarding documents having a neutral relationship with one or more documents in the hierarchy. In some cases, neutral relationships can be identified only for an initially provided document identifier used as the starting point for an upstream or downstream search, while in other cases neutral relationships can be identified for documents identified during the search process, including in scenarios where results are limited to those of particular document types, document relationships, or degrees of indirection between documents.

At 2410, document keys are obtained to be used in the process 2400, which can include all or a portion of documents in a document flow. In a particular example, the document key or keys are for those of a source document identifier sent from a source system to a target system, such as described with respect to FIG. 13. Getting the document keys at 2410 can include determining a key at a receiver or target system for a document key received from the source system.

It is determined at 2414 whether any neutral documents exist for the keys. If not, the process 2400 can end at 2418, otherwise the process proceeds to 2422 to determine whether a key of the document keys exists in a document hierarchy (which can correspond to upstream/downstream search results). If it is determined that the document key exists in the hierarchy, the neural document (or documents) are added to the hierarchy as child nodes for the existing document key at 2426. For example, assume that it is determined that a document A is associated with a neutral document B. If document A is in the hierarchy, then document B is added as a child of document A.

If it is determined at 2422 that a key of the document keys does not exist in the hierarchy, the neutral document can be added to the hierarchy as a root (non-child) node at 2430. In the example above, document B would be added as a new, non-child node to the hierarchy.

After 2426 or 2430, it is determined at 2434 whether there are additional document keys to be processed. If so, the process 2400 returns to 2412 to determine whether neutral documents exist for the next document key, otherwise the process ends at 2418.

Figure 25:
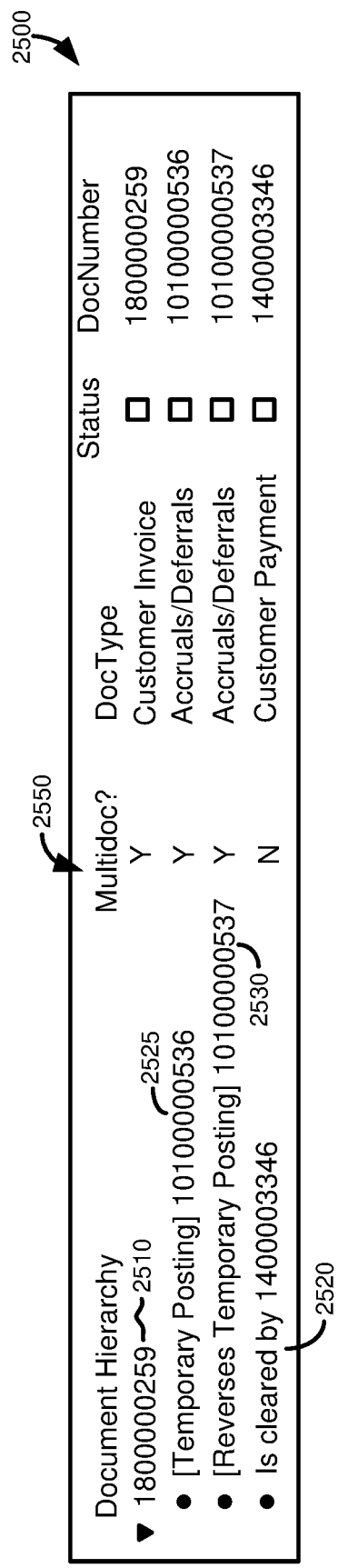
FIG. 25 is an example display that can be generated to illustrate documents having a neutral relationship with a document of a document hierarchy, and which can be generated at least in part using the process of FIG. 24.

FIG. 25 provides an example display 2500 of a portion of a hierarchy visualization that can be generated and displayed using disclosed techniques, and which includes neutral documents. The display 2500 includes a root document 2510 and a document 2520 that performs a clearing on the root document. Documents 2525, 2530 represent neutral documents.

In particular implementations, a user can select whether to include neutral documents in a display. If neutral documents were not specified for inclusion, the display 2500 would omit documents 2525, 2530. As has been described, the display 2500 can be generated by first preparing a document flow/hierarchy that does not include documents having a neutral relationship, and then supplementing the hierarchy with such documents.

In order to assist a user in understanding what documents are related by neutral relationships, a column 2550 can be provided that allows such relationships to be identified. In this case, a "multidoc" indicator describes that documents 2510, 2525, and 2530 were all based on a common document identifier, such as a document identifier received from a source system, or where the document identifier of the document 2510 serves as the common/root identifier.

Example 18—Example Implementations

FIGS. 26A-26J provide example implementation details for a particular implementation of disclosed techniques. The implementation details include data structures/data object types that can be used to store information about documents and their relationships and storing tree hierarchy information, and example classes that can be used to implement various aspects of the present disclosure.

In some cases, documents can have data captured in a "header" table as well as data in an "item" table that references a header table, where "header" and "item" can have the meanings as used in technologies available from SAP SE of Walldorf, Germany. As an example, header information can include information such as a document number, a document date and a posting date, as well as references to other documents. Examples of item information include types of accounts, posting keys, amounts, and tax rates, as well as relationship information. An example of a header table is the BKPF table (accounting document header).

FIG. 26A illustrates examples of various item tables, such as BSEG-ADD, ACDOCA, and BSEG. Note that FIG. 26A also lists "document status" types. In some cases, errors can occur in replicating or processing documents, or other process status information can be generated, and error or status codes can indicate a table to be used in identifying related documents using disclosed techniques. In this way, the disclosed upstream and downstream search processes can be tied into particular workflows/use cases, and a particular relationship source specified for use in the document search processes, including the processes 1400, 1500 of FIGS. 14 and 15.

FIG. 26B illustrates a domain having a data type having values that indicate various search modes. The data type values can be used, for example, when a request is made to perform a document flow analysis.

FIG. 26C illustrates various data elements, and their corresponding domains, that can be used with disclosed processes. The data elements include those for a relation type (for example, cleared by, replicates to), a relation level (which can represent a degree of indirection), and a search mode, which can have a value indicating one of the search modes described with respect to FIG. 26B.

FIG. 26D represents a structure for storing document relation information, such as in a relational database table. In particular, note that a table 2640 has an attribute 2644*a* indicating a document identifier for a particular document, an attribute 2644*b* providing an identifier for a preceding document, an attribute 2644*c* identifying a particular relation for a given row of the table (including particular values for the attributes 2644*a*, 2644*b*), and an attribute 2644*d* indicating a particular relation level for the relationship. Other attributes can represent additional information that may be displayed to a user in conjunction with a particular document/relationship, or otherwise provided in response to a document flow analysis request.

FIG. 26E illustrates example information that can be maintained for documents identified using a document flow analysis. That is, for example, the information in the table 2640 of FIG. 26D can maintain information about document relationships, while a table 2650 of FIG. 26E can represent more detailed information about documents having a relationship, where some or all of the information can optionally be presented in a user interface/provided in response to a document flow analysis request, or at least made available upon a further request.

Alternatively, the information in the table 2650 can be used to identify related documents. For instance, a source of document information may include attributes that are not of interest for a document flow analysis, or the attributes used for a document flow analysis can be in multiple tables, which can require JOIN operations, while can be computationally expensive. Including all of the information in a single table can reduce the computational complexity of a document flow analysis, and also result in results being provided more quickly.

As discussed earlier, in some cases disclosed techniques can be used to help reconcile document flows at different systems, or to supplement document information at one system with document information from another system. FIG. 26F illustrates one technique of sending data from a source system to a receiving system. The data sent can include information from the table 2650 of FIG. 26E. The information can also include an identifier that identifies a transfer category of the transfer. Values for the transfer category can include whether the transfer category is for a balance phase of an inbound layer, a document phase of an inbound layer, an ongoing replication, or whether the document is not transfer relevant. "Inbound layer" can have the meaning as used in products available from SAP SE of Walldorf, Germany.

FIG. 26G is a list of attributes that can be included in a source document item, and can be generally similar to the attributes that can be included in the table 2650 of FIG. 26E, in terms of the use of the information, although certain attributes can be different than those of the "basic" document chain of FIG. 26E.

The discussion of FIG. 17, and elsewhere in the present disclosure, includes a "tree hierarchy" or "document tree." FIG. 26H illustrates attributes that can be included in a table describing nodes of the document tree. The tree attributes generally include a key that uniquely identifies a node, an identifier that uniquely identifies the document represented by the node, and an identifier that uniquely identifies a predecessor/parent document. In some aspects, additional information can be included, such as including a "subsequent document" identifier in addition to, or in place of, the identifier of the predecessor document. The tree attributes also include a description of the relation type between the current document and its parent document, and an identifier of the level of the relationship.

FIG. 26I illustrates components of a remote function call that can be used to request execution of a document flow analysis. The components can represent information provided at operation 1408 of the process 1400 of FIG. 14 or operation 1508 of the process 1500 of FIG. 15. In particular, the input parameters used with the remote function call can provide keys for documents to be included as starting points for the search and an identifier of a search mode, such as whether the search is an upstream search, a downstream search, or a combined search. The information returned can be information described in conjunction with FIGS. 26D, 26E, and 26G, as well as any error messages that may have been generated in conducting the document flow analysis.

Figure 26J:
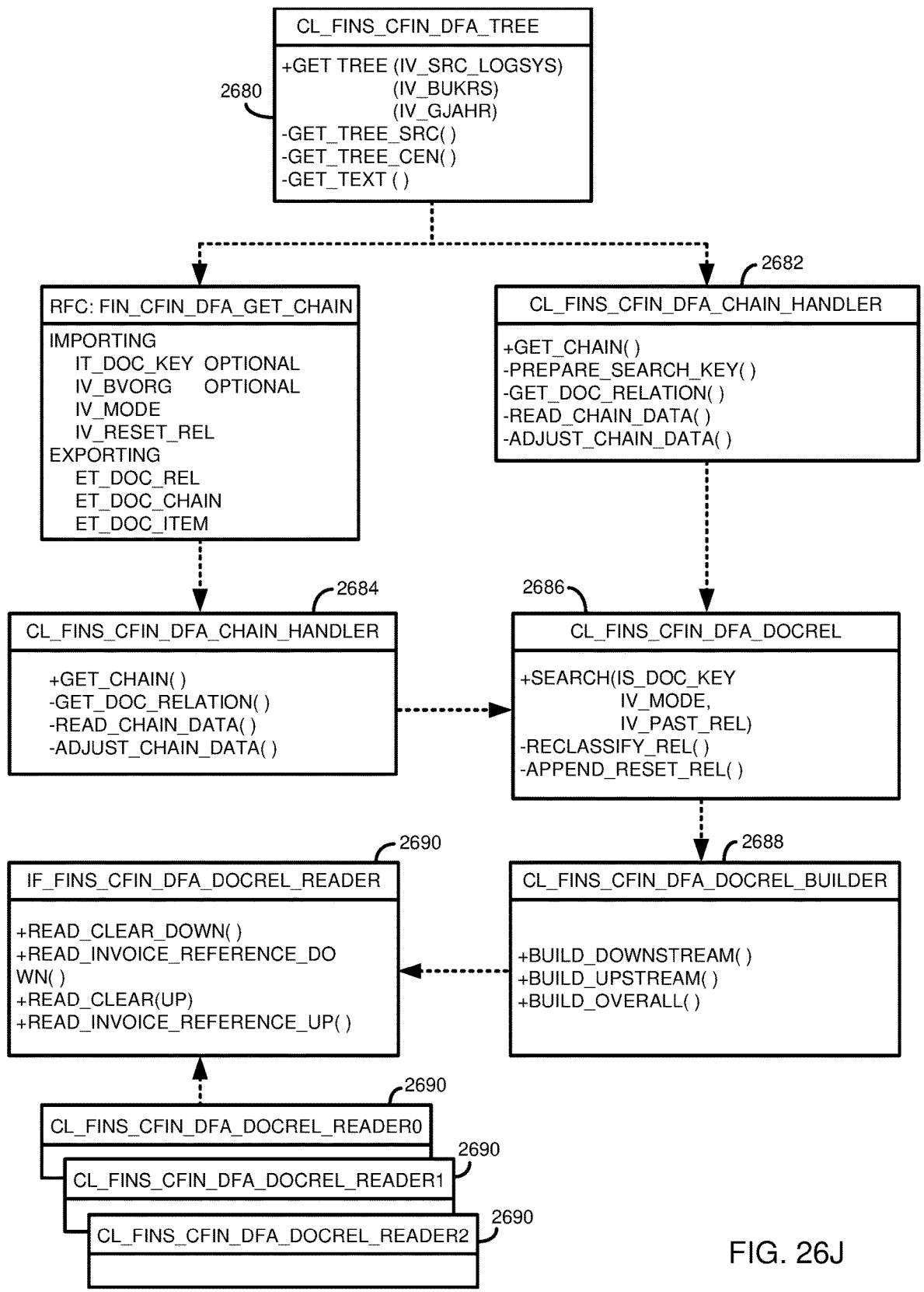
FIG. 26J is an example class diagram of classes that can be used to implement disclosed innovations.

FIG. 26J is a class diagram of computing classes (for example, as implemented in programming languages such as JAVA or C++) that can be used to implement disclosed techniques. In particular, a "tree" class 2680 can be used as a façade to trigger various classes. The tree class 2680 interacts with chain handler classes 2682, 2684 that are used to build document chains at a source and receiver system. In the case where only a single system is of interest, only a single handler class need be used. A class 2686 builds document relationships, and uses a relationship builder class 2688 to build search results for a specified search mode. The relationship builder class 2688 can use the services of one or more document reader classes 2690.

Example 19—Example Document Flow Analysis

Figure 27:
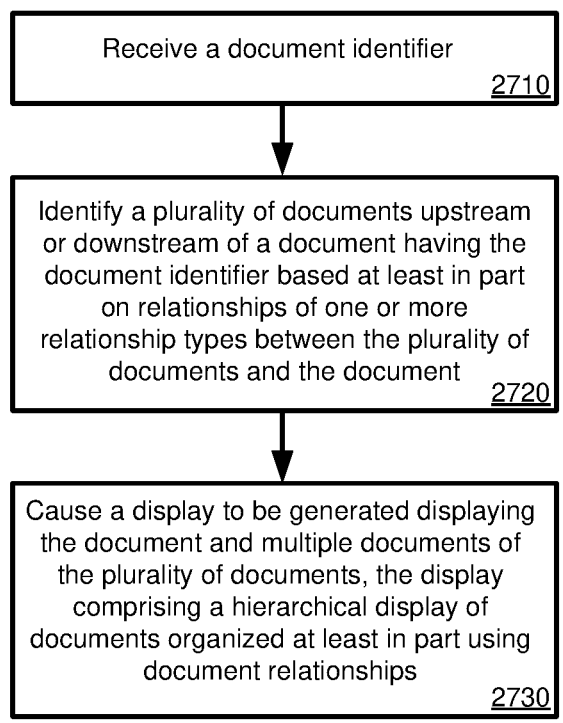
FIG. 27 is a flowchart of an example technique for generating and displaying a document flow analysis.

FIG. 27 provides a flowchart of a method 2700 for generating a display of hierarchically related documents. At 2710, a document identifier is received. A plurality of documents upstream or downstream of a document having the document identifier are identified at 2720 based at least in part on relationships of one or more relationship types between the plurality of documents and the document. At 2730, a display is caused to be generated displaying the document and multiple documents of the plurality of documents, the display comprising a hierarchical display of documents organized at least in part using document relationships.

Example 20—Computing Systems

Figure 28:
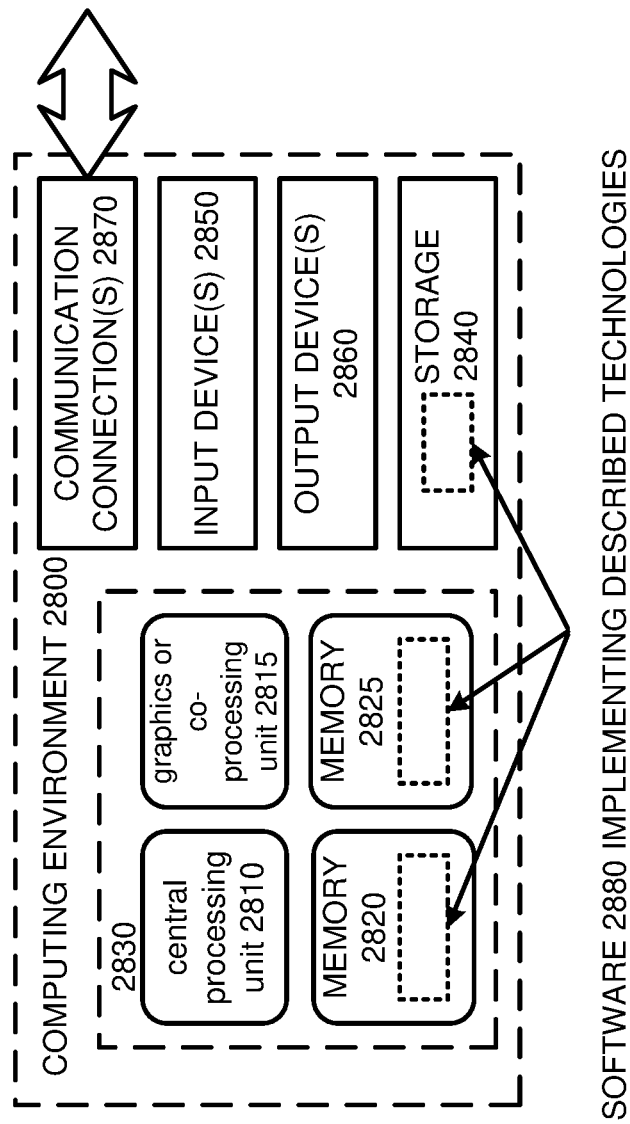
FIG. 28 is a diagram of an example computing system in which some described embodiments can be implemented.

FIG. 28 depicts a generalized example of a suitable computing system 2800 in which the described innovations may be implemented. The computing system 2800 is not intended to suggest any limitation as to scope of use or functionality of the present disclosure, as the innovations may be implemented in diverse general-purpose or special-purpose computing systems.

With reference to FIG. 28, the computing system 2800 includes one or more processing units 2810, 2815 and memory 2820, 2825. In FIG. 28, this basic configuration 2830 is included within a dashed line. The processing units 2810, 2815 execute computer-executable instructions, such as for implementing components of the processes of the present disclosure. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 28 shows a central processing unit 2810 as well as a graphics processing unit or co-processing unit 2815. The tangible memory 2820, 2825 may be volatile memory (e.g., registers, cache, RAM), non-volatile memory (e.g., ROM, EEPROM, flash memory, etc.), or some combination of the two, accessible by the processing unit(s) 2810, 2815. The memory 2820, 2825 stores software 2880 implementing one or more innovations described herein, in the form of computer-executable instructions suitable for execution by the processing unit(s) 2810, 2815. The memory 2820, 2825, may also store settings or settings characteristics, databases, data sets, interfaces, displays, object instances, or model.

A computing system 2800 may have additional features. For example, the computing system 2800 includes storage 2840, one or more input devices 2850, one or more output devices 2860, and one or more communication connections 2870. An interconnection mechanism (not shown) such as a bus, controller, or network interconnects the components of the computing system 2800. Typically, operating system software (not shown) provides an operating environment for other software executing in the computing system 2800, and coordinates activities of the components of the computing system 2800.

The tangible storage 2840 may be removable or non-removable, and includes magnetic disks, magnetic tapes or cassettes, CD-ROMs, DVDs, or any other medium which can be used to store information in a non-transitory way, and which can be accessed within the computing system 2800. The storage 2840 stores instructions for the software 2880 implementing one or more innovations described herein.

The input device(s) 2850 may be a touch input device such as a keyboard, mouse, pen, or trackball, a voice input device, a scanning device, or another device that provides input to the computing system 2800. The output device(s) 2860 may be a display, printer, speaker, CD-writer, or another device that provides output from the computing system 2800.

The communication connection(s) 2870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 21—Cloud Computing Environment

Figure 29:
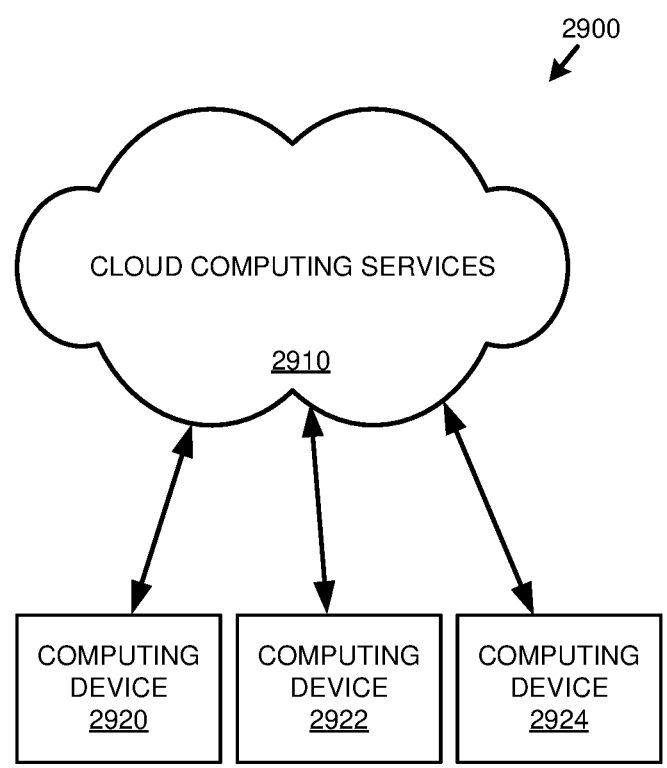
FIG. 29 is an example cloud computing environment that can be used in conjunction with the technologies described herein.

FIG. 29 depicts an example cloud computing environment 2900 in which the described technologies can be implemented. The cloud computing environment 2900 comprises cloud computing services 2910. The cloud computing services 2910 can comprise various types of cloud computing resources, such as computer servers, data storage repositories, networking resources, etc. The cloud computing services 2910 can be centrally located (e.g., provided by a data center of a business or organization) or distributed (e.g., provided by various computing resources located at different locations, such as different data centers and/or located in different cities or countries).

The cloud computing services 2910 are utilized by various types of computing devices (e.g., client computing devices), such as computing devices 2920, 2922, and 2924. For example, the computing devices (e.g., 2920, 2922, and 2924) can be computers (e.g., desktop or laptop computers), mobile devices (e.g., tablet computers or smart phones), or other types of computing devices. For example, the computing devices (e.g., 2920, 2922, and 2924) can utilize the cloud computing services 2910 to perform computing operations (e.g., data processing, data storage, and the like).

Example 22—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 28, computer-readable storage media include memory 2820 and 2825, and storage 2840. The term computer-readable storage media does not include signals and carrier waves. In addition, the term computer-readable storage media does not include communication connections (e.g., 2870).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one hardware processor;
   at least one memory coupled to the at least one hardware processor; and
   one or more computer-readable storage media storing computer-executable instructions that, when executed, cause the computing system to perform operations comprising:

receiving a document identifier;
in response to receiving the document identifier, and using the document identifier, identifying a plurality of documents upstream or downstream, in a defined document flow of a process, of a document having the document identifier based at least in part on relationships of one or more relationship types between the plurality of documents and the document, wherein a relationship type for a relationship between two documents indicates whether a document is upstream of another document or is downstream of another document; and
causing a display to be generated displaying the document and multiple documents of the plurality of documents, the display comprising a hierarchical display of documents organized in multiple hierarchical levels at least in part using document relationships, wherein a downstream document is at a lower hierarchical level than the document having the document identifier and an upstream document is at a higher hierarchical level than the document having the document identifier.

2. The computing system of claim 1, wherein the display does not comprise documents not having a direct or indirect relationship with a document associated with the document identifier.

3. The computing system of claim 1, wherein the hierarchical display has a plurality of levels and a document having the document identifier forms a root level of the hierarchical display.

4. The computing system of claim 3, wherein a first set of one or more hierarchical levels depending from the root level comprises documents having a direct relationship with the document having the document identifier.

5. The computing system of claim 4, wherein a second set of one or more hierarchical levels comprising documents having a direct relationship with a document within the first set of one or more hierarchical levels, and having an indirect relationship with the document having the document identifier.

6. The computing system of claim 5, wherein the display comprises an identifier or description of a relationship type between the document associated the document identifier and a given document of the first set of one or more hierarchical levels.

7. The computing system of claim 6, wherein the display provides a respective document type for the document having the document identifier and the multiple documents of the plurality of documents.

8. The computing system of claim 1, wherein the receiving a document identifier is part of a document flow analysis request that specifies a search mode.

9. The computing system of claim 8, wherein the search mode consists of an upstream search.

10. The computing system of claim 9, wherein an upstream search identifies one or more documents that were affected by a particular document being analyzed.

11. The computing system of claim 8, wherein the search mode consists of a downstream search.

12. The computing system of claim 11, wherein the downstream search identifies one or more documents that affected a particular document being analyzed.

13. The computing system of claim 8, wherein the search mode comprises both an upstream search and a downstream search for at least a portion of documents identified from the upstream search.

14. The computing system of claim 1, wherein the display provides a respective document type for the document and the multiple documents of the plurality of documents.

15. The computing system of claim 1, the operations further comprising:
prior to the generating, sending data identifying the document and the multiple documents to be used in generating the display, relationships between the document and the multiple documents, and data providing values for attributes associated with the document and the multiple documents.

16. The computing system of claim 15, wherein the document and the plurality of documents are part of a dataset comprising additional documents, and data for the additional documents is not sent.

17. The computing system of claim 1, wherein the identifying a plurality of documents upstream or downstream of a document comprises analyzing data specified for the document having the document identifier.

18. The computing system of claim 17, wherein a document identifier of a document related to the document having the document identifier is specified in the data specifies for the document having the document identifier.

19. A method, implemented in a computing system comprising at least one memory and at least one hardware processor coupled to the at least one memory, the method comprising:
receiving a document identifier;
in response to receiving the document identifier, and using the document identifier, identifying a plurality of documents upstream or downstream, in a defined document flow of a process, of a document having the document identifier based at least in part on relationships of one or more relationship types between the plurality of documents and the document, wherein a relationship type for a relationship between two documents indicates whether a document is upstream of another document or is downstream of another document; and
generating a display to be generated displaying the document and multiple documents of the plurality of documents, the display comprising a hierarchical display of documents organized in multiple hierarchical levels at least in part using document relationships, wherein a downstream document is at a lower hierarchical level than the document having the document identifier and an upstream document is at a higher hierarchical level than the document having the document identifier.

20. One or more computer-readable storage media comprising:
computer-executable instructions that, when executed by a computing system comprising at least one hardware processor and at least one memory coupled to the at least one hardware processor, cause the computing system to receive a document identifier;
computer-executable instructions that, when executed by the computing system, cause the computing system to, in response to receiving the document identifier, and using the document identifier, identify a plurality of documents upstream or downstream, in a defined document flow of a process, of a document having the document identifier based at least in part on relationships of one or more relationship types between the plurality of documents and the document, wherein a relationship type for a relationship between two documents indicates whether a document is upstream of another document or is downstream of another document; and computer-executable instructions that, when executed by the computing system, cause the computing system to cause a display to be generated displaying the document and multiple documents of the plurality of documents, the display comprising a hierarchical display of documents organized in multiple hierarchical levels at least in part using document relationships, wherein a downstream document is at a lower hierarchical level than the document having the document identifier and an upstream document is at a higher hierarchical level than the document having the document identifier.

\* \* \* \* \*